United States Patent [19]

Coad, Jr. et al.

[11] 4,392,409

[45] Jul. 12, 1983

[54] SYSTEM FOR TRANSCRIBING ANALOG SIGNALS, PARTICULARLY MUSICAL NOTES, HAVING CHARACTERISTIC FREQUENCIES AND DURATIONS INTO CORRESPONDING VISIBLE INDICIA

[75] Inventors: Peter Coad, Jr., La Habra, Calif.; David E. Wilensky, Emporin, Kans.

[73] Assignee: The Way International, New Knoxville, Ohio

[21] Appl. No.: 101,102

[22] Filed: Dec. 7, 1979

[51] Int. Cl.³ ........................ G01D 9/40; G09B 15/02; G10G 3/04

[52] U.S. Cl. .................................... 84/462; 84/477 R; 346/33 R

[58] Field of Search ....................... 84/1.03, 1.12, 1.28, 84/462, 477 R; 346/33 R, 75

[56] References Cited

U.S. PATENT DOCUMENTS

| | | | |
|---|---|---|---|
| 3,539,701 | 11/1970 | Milde | 84/1.28 |
| 3,634,596 | 1/1972 | Rupert | 84/1.28 |
| 3,647,929 | 3/1972 | Milde, Jr. | 84/1.28 X |
| 3,781,452 | 12/1973 | Vauclain | 84/1.28 |
| 3,915,047 | 10/1975 | Davis et al. | 84/1.03 |
| 3,926,088 | 12/1975 | Davis et al. | 84/462 |
| 4,014,237 | 3/1977 | Milde, Jr. | 84/1.12 |
| 4,022,097 | 5/1977 | Strangio | 84/462 X |
| 4,023,456 | 5/1977 | Groeschel | 84/462 X |
| 4,024,789 | 5/1977 | Humphrey et al. | 84/477 R |
| 4,104,949 | 8/1978 | Clark | 84/462 |

*Primary Examiner*—S. J. Witkowski

*Attorney, Agent, or Firm*—Finnegan, Henderson, Farabow, Garret & Dunner

[57] ABSTRACT

A system for transcribing a sequence of input analog signals having characteristic frequencies and durations into indicia which visibly reflect the frequencies and durations of the input analog signals. The system uses the principles that the frequency of an analog signal can be determined from the number of zero crossings the signal makes in a predetermined time period and that the durations of the input analog signals can be determined from the number of successive time periods that the determined frequencies remain the same.

In the preferred embodiment, the system transcribes successive musical tones into corresponding musical notes. A microphone produces electrical signals corresponding to the musical tones and a frequency digitizer circuit produces a digital signal train comprising a digital pulse for each zero crossing of the electrical signals. A counter counts the number of pulses in the digital signal train and, at predetermined time intervals, a timer transfers the contents of the counter to a count buffer to store as counts the frequencies of the musical tones during each time interval. A programmed digital computer accesses the counts in the count buffer and determines the frequency of each musical tone from the values of its corresponding counts and the duration of each tone from the number of successive counts of the same value. The digital computer also produces an indicia code reflecting the frequency and duration of each note. From the indicia codes, a printer produces, on an output medium, the musical notes in their proper positions on a musical staff.

27 Claims, 6 Drawing Figures

SYSTEM FOR TRANSCRIBING ANALOG SIGNALS, PARTICULARLY MUSICAL NOTES, HAVING CHARACTERISTIC FREQUENCIES AND DURATIONS INTO CORRESPONDING VISIBLE INDICIA

FIELD OF THE INVENTION

This invention relates to apparatus for directly translating analog signals having characteristic frequencies and durations into corresponding visible indicia representing the frequencies and durations of the analog signals and more particularly to such apparatus for translating musical tones into printed musical notes.

BACKGROUND OF THE INVENTION

The advantages have long been recognized in providing an apparatus for automatically and directly translating analog signals having characteristic frequencies and durations, e.g., musical tones or notes, into visible representations of the analog signals. Such a system has particular applicability in translating musical tones directly into visible representations of the notes played in the form of sheet music. The automatic transcription of the tones to sheet music frees the composer or performer of the tones from the constant need to interrupt playing in order to write down the notes. Such constant interruptions are disruptive of the composing process and cause inefficient use of the composer's time.

The prior art shows, for the most part, two ways for providing this automatic transcription. The first method requires the attachment of mechanical devices to the particular musical instrument being used to sense the movement of the keys of the musical instrument and to transmit them to a transcription device. This arrangement has the inherent disadvantages of requiring bulky mechanical couplings to the musical instrument and requiring that the composing process only occur when such mechanical couplings are available.

The second type of prior art device for automatic transcription requires a large array of band pass filters tuned to the array of frequencies to be transcribed. Such arrays are not only expensive but restrict the flexibility of the device to these selected frequencies.

SUMMARY OF THE INVENTION

It is, therefore, an object of the present invention to provide an apparatus for automatically transcribing analog signals having characteristic frequencies and durations into visible indicia which fully represent the frequencies and durations of the signals.

It is another object of the present invention to improve an apparatus especially adapted to transcribing musical tones into musical notes.

Another object of the present invention is to improve an apparatus for transcribing musical tones into musical notes which does not require coupling external mechanical transducers to the device producing the musical tones.

It is yet another object of the present invention to provide a musical transcription apparatus which does not require the use of tuned band pass filters but employs digital techniques for determining the characteristic frequencies and durations of the musical notes.

To achieve these objects, and in accordance with the purpose of the invention, as embodied and broadly described herein, the system for translating a series of analog signals having characteristic frequencies and durations into written indicia representing the signals comprises means for converting the analog signals into a corresponding series of electrical signals having corresponding characteristic frequencies and durations, means for generating a series of digital signals corresponding to the series of electrical signals wherein the series of digital signals reflect both the characteristic frequencies and durations of the corresponding analog signals and for counting the number of digital signals occurring in the latter series during successive time intervals of predetermined length, means for producing a series of indicia codes from the counts produced by the generating and counting means, each of the indicia codes also representing both the frequency and duration of a corresponding one of the analog signals, and means for printing indicia representing the indicia codes on a record medium, the printed indicia identifying both the frequency and duration of corresponding ones of the analog signals.

In the environment wherein the system is used to transcribe a series of individual audio tones into written indicia, the system comprises transducer means for converting the musical tones into electrical signals having continuous transitions between positive and negative values through a zero value; frequency digitizer circuit means comprising a comparator for producing a series of digital pulses having leading edges and trailing edges wherein each leading edge of a digital pulse coincides with the transition in the electrical signal from a positive value to a zero value and each trailing edge of a digital pulse coincides with the transition of the electrical signal from a negative value to a zero value; pulse-doubling means for generating a digital signal for each leading edge and for each trailing edge of a digital pulse; pulse-combining means for producing a serial train of digital signals; means for counting the pulses in the serial train of digital signals; buffer means for storing the counts produced by the counting means; timer means coupled to the counting and storing means and the pulse buffer means (a) for cyclically transferring the count in the pulse counting and storing means to the buffer means at uniform, predetermined time intervals, (b) for generating pulses to reset said pulse counting and storing means and said pulse buffer means, and (c) for producing buffer emptying pulses for initiating transfers of the counts stored in the buffer means to the processor means, wherein each of the counts transferred to the processing means represents the number of transitions from a positive value to a zero value and from a negative value to a zero value occurring in the audio tones during a time interval; producing means comprising (a) means for determining the frequency of each tone from the value of a count corresponding to the tone, (b) means for determining the duration of each of the audio tones from the number of successively received counts determined to be of the same frequency, and (c) means for generating a series of indicia codes from the determined frequencies and durations, wherein each of the indicia codes corresponds to one of the audio tones; and means for printing indicia in correspondence with the indicia codes on a record medium.

The accompanying drawings, which are incorporated in and constitute a part of this specification, illustrate an embodiment of the invention and, together with the description, serve to explain the principles of the invention.

DESCRIPTION OF THE PREFERRED EMBODIMENT

Reference will now be made in detail to the present preferred embodiment of the invention, an example of which is illustrated in the accompanying drawings.

Figure 1:
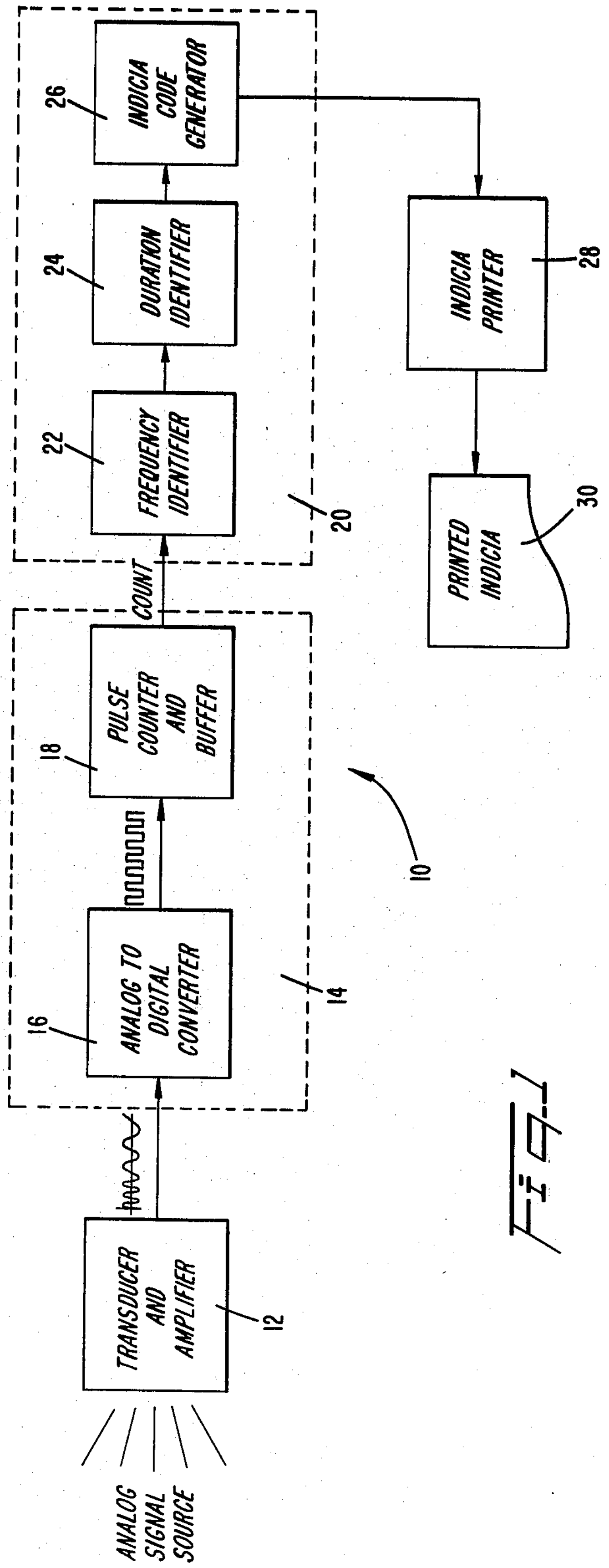
FIG. 1 is a general block diagram of an analog signal transcriber system in accordance with the present invention.

The preferred embodiment of an analog signal transcriber system is shown in FIG. 1 and is generally represented by the numeral 10. The analog signals to be transcribed could be acoustic energy waves arising during the study of solid, liquid or gaseous mediums, geophysical signals, audio tones, or other types of analog signals which can be converted from their physical state into continuous electrical signals representing the analog signals. The analog signals must be in sequence and have characteristic frequencies and durations which are capable of being identified by a transcriber system and converted into visible indicia representing and identifying the frequency and duration of the analog signals.

The electrical signal representations of the analog signals are provided as inputs to the means for converting said analog signals into a corresponding series of electrical signals having corresponding characteristic frequencies and durations. As embodied herein and shown in FIG. 1, the converting means is transducer 12 which, in the instance of an audio input, could be a microphone coupled to a studio-quality amplifier with a 10 volt peak-to-peak output at an impedance of 600 (ohms).

In accordance with the invention, the analog-to-digital converter is included in the means for generating a series of digital signals corresponding to the electrical signals and for counting the number of digital signals occurring in the series of digital signals during successive time intervals of predetermined length. As embodied herein, the generating and counting means comprises frequency digitizer circuit means 14 for generating a pulse train of digital signals corresponding to the electrical signals. The frequency digitizer circuit means 14 also counts the number of signals in the pulse train occurring during specific time intervals of a predetermined duration and stores the counts. The frequency digitizer circuit means comprises an analog to digital converter 16 which produces the series of digital signals from the electrical signals and provides the digital signals to the pulse counter and buffer 18. The output of the pulse counter and buffer 18 comprise counts of the number of digital signals occuring during specific time periods.

These counts are provided as inputs to the means 20 for producing a series of indicia codes from the counts produced by frequency digitizer circuit means 14. Each of the indicia codes represents both the frequency and the duration of a corresponding one of the analog signals provided as input to the transducer 12. As embodied herein, the producing means comprises a frequency identifier 22 which determines the frequency of an analog signal from the count produced by the pulse counter and buffer 18, a duration identifier 24 which determines the duration of an analog signal from the number of continuously received counts of the same identified frequency, and an indicia code generator 26 which produces an indicia code reflecting the frequency and duration of an analog signal.

In accordance with the invention, the generated indicia codes are passed on to the means for printing indicia representing the indicia codes. As herein embodied, this means includes an indicia printer 28 for producing a record 30 with visible printed indicia thereon. Since each of the indicia codes passed from the indicia code generator 26 to the indicia printer 28 represents the duration and frequency of an analog signal from the analog signal source, then the printed indicia are a visible record corresponding to the analog signals.

Musical notes, as they are printed on sheet music, are examples of one type of printed indicia which correspond to analog signals. Each note of the scale has a characteristic frequency in the audio range and is produced for a finite duration. Commonly, such durations are identified as whole notes, half notes, quarter notes, etc. The analog signal transcriber system, however, is not limited to printing music, but finds application wherever a sequence of selected analog signals having characteristic frequencies and durations that can then be identified by printed signals.

Figure 2:
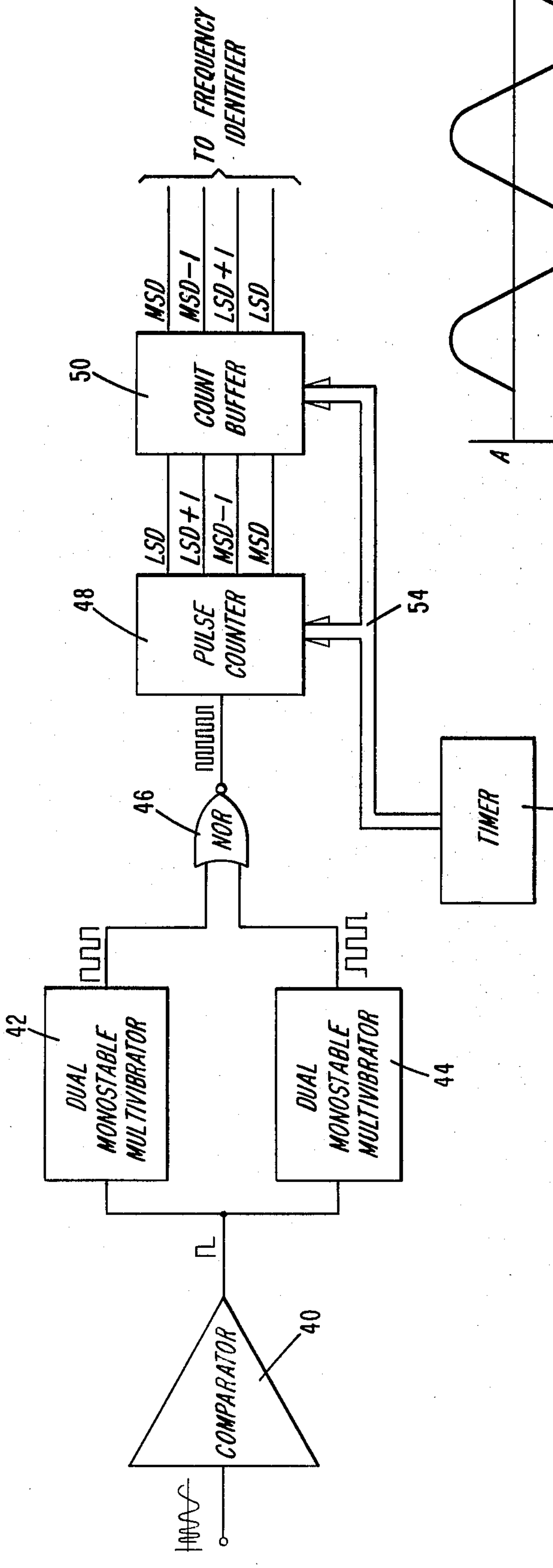
FIG. 2 shows, in block diagram form, an embodiment of the analog-to-digital converter, and pulse counter and buffer as depicted in FIG. 1.
Figure 3:
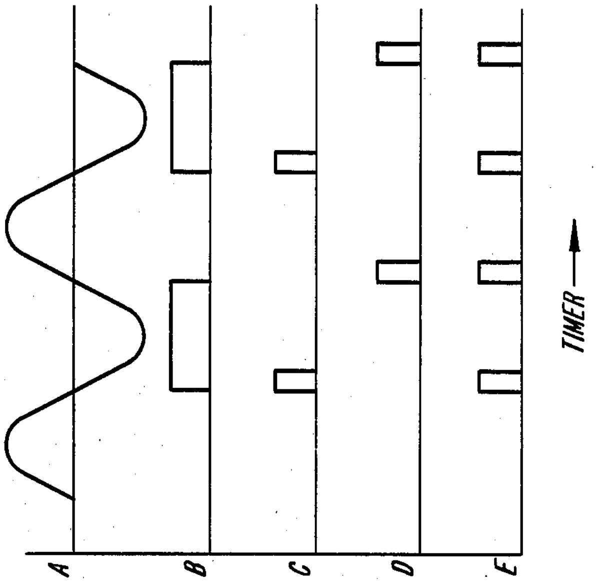
FIG. 3 is a timing diagram to be read in accordance with FIG. 2.

FIG. 2 is a detailed embodiment of frequency digitizer circuit means 14. The five signal wave forms, A–E shown in FIG. 3, are to be read in conjunction with the apparatus of FIG. 2.

As previously explained, the frequency digitizer circuit means 14 is embodied as an analog-to-digital converter 16 and a pulse counter and buffer 18. The analog-to-digital converter 16 is further embodied as comparator means 40 which receives the continuous electrical signals such as wave form A representing analog signals and generates digital outputs such as wave form B which includes digital pulses of a duration equal to the period that wave form A is below some reference point such as 0. An example of a suitable comparator means 40 is a zero-crossing detector.

The output of the comparator means 40 is provided as input to a pulse-doubling means for generating a digital signal for each leading edge and for each trailing edge of a digital signal produced by the comparator means 40. As herein embodied, the pulse-doubling means comprises two dual monostable multivibrators (dual one shots) 42 and 44. An exemplar multivibrator is MN54C221 manufactured by National Semiconductor. The output of dual monostable multivibrator 42 is shown as wave form C in FIG. 3. It can be seen that the dual monostable multivibrator 42 provides an output pulse for each leading edge of the digital pulse produced by the comparator means 40. Similarly, the output wave form for the dual monostable multivibrator 44 is shown by wave form D. This wave form comprises a digital pulse produced for each trailing edge of the digital signals produced by the comparator means 40.

The outputs of the dual monostable multivibrators 42 and 44 are provided as inputs to a pulse-combining means for producing a single serial train of digital pulses from the digital signals produced by the multivibrators. As herein embodied, the pulse combining means comprises NOR gate 46. The comparator means 40 together with the dual monostable multivibrators 42 and 44 and the NOR gate 46 together comprise the analog digital converter 16 shown in FIG. 1. Waveform E illustrates the outout of NOR gate 46.

In accordance with the invention, the serial train of digital signals produced by the NOR gate 46 is provided as an input to the counting means which counts the number of signals occurring in the serial train during predetermined time intervals and temporarily stores the counts. As embodied herein, the counting means comprises a pulse counter 48 which continually counts the number of pulses received from NOR gate 46 and then at proper times provides the stored counts as four binary coded decimal (BCD) integers LSD, LSD+1, MSD−1 and MSD for transfer to the count buffer 50. A suitable pulse counter 48 is Model MK5007N manufactured by Mostek, Inc.

The four BCD integers are stored in a buffer means which is embodied as a count buffer 50. A timer means is provided for cyclically transferrring the counts stored in the pulse counter 48 to the count buffer 50 at uniform, predetermined time intervals and for producing buffer emptying pulses to initiate the transfer of the counts stored in count buffer 50 to the frequency identifier 22 in the form of four BCD digits MSD, MSD−1, LSD+1 and LSD. The timer means also provides pulses for resetting the count in the pulse counter 48 and clearing the storage locations in the count buffer 50.

As embodied herein, the timer means comprises timer 52 coupled to pulse counter 48 and count buffer 50 by data bus 54. The timer 52 controls the transfer of the count in the pulse counter 48 to the count buffer 50. The time period between transfers is controlled by the timer 52 and could, for example, be 1/10th of a second. This would mean that the count transferred from pulse counter 48 to the count buffer 50 would coincide with the number of digital pulses occurring in the digital pulse train transferred from NOR gate 46 to the pulse counter 48 in 1/10th of a second. The 1/10th of a second time period is chosen as an example, and one skilled in the art would adjust the duration of the time period to optimize the performance of the system according to the anticipated frequencies of the digital signals.

Figure 4:
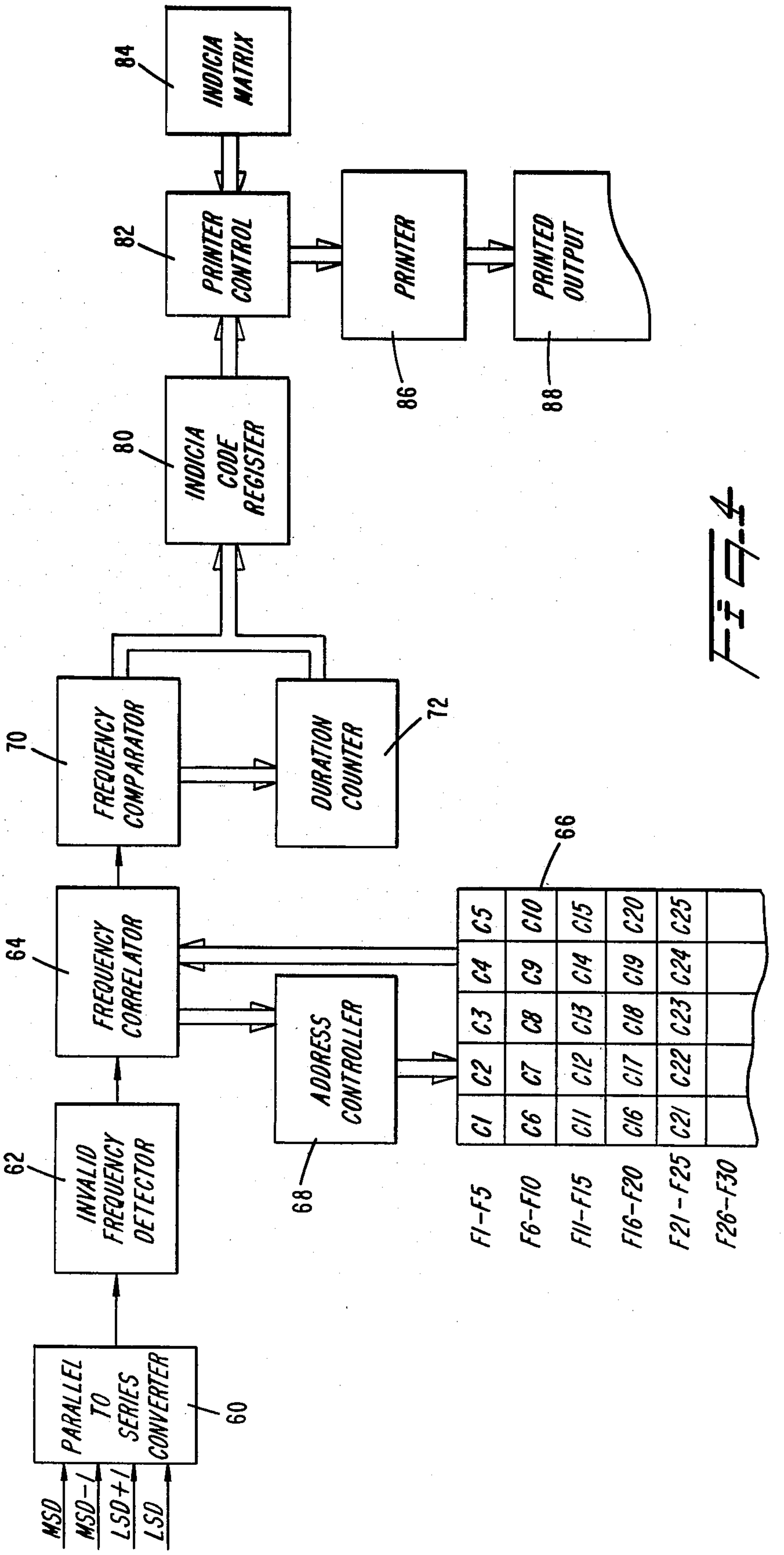
FIG. 4 shows, in block diagram form, an embodiment of the frequency identifier, duration identifier and indicia code generator of FIG. 1.

FIG. 4 depicts a detailed embodiment of the means 20 for producing a series of indicia codes from the count stored in the count buffer 50. As previously discussed with regard to FIG. 1, the producing means 20 comprises means 22 for determining the frequency of an analog signal, means 24 for determining the duration of an analog signal and means 26 for generating indicia codes corresponding to the determined frequencies and durations.

As embodied herein, the frequency determining means comprises a parallel-to-series converter 60 which receives the four BCD digits from the count buffer 50 and provides them in serial form to the invalid frequency detector 62. Invalid frequency detector 62 compares the count received to counts corresponding to the highest valid frequency and the lowest valid frequency to determine whether the count falls within an acceptable range.

If the frequency is determined to be valid, the count is passed on to frequency correlator 64 which is coupled to a memory matrix 66 and an address controller 68. The storage positions in the memory matrix 66 contain unique codes for each valid frequency which may be transcribed by the system. The address controller 68 is employed to directly address the location within the memory matrix 66 wherein a code is stored which corresponds to a count received by the frequency correlator 64. A suitable code storage arrangement is to store the codes C1–C5 corresponding to the first five valid frequencies F1–F5 in the first five storage positions of the memory matrix 66. Similarly, codes C6–C10 corresponding to F6–F10 are stored in memory storage locations 6 through 10. The count received by the frequency correlator 64 is provided to the address controller 68 and the proper address in the memory matrix 66 is generated and the code accessed. The code is thereafter provided to the frequency correlator 64 where it is passed on to the frequency comparator 70.

The frequency comparator 70 and duration counter 72 embody the means for determining the duration of an analog signal from the number of successively received counts having the same determined frequency. As embodied herein, this is accomplished by the frequency comparator 70 comparing successively received codes from the frequency correlator 64 and incrementing the duration counter 72 whenever the successively received codes are identical. This continues until the frequency comparator 70 determines that successive codes are no longer the same and at which time frequency comparator 70 causes the count in the duration counter 72 and the frequency code corresponding to that count to be transferred to the indicia code register 80. The indicia code register 80 embodies the means for generating indicia codes corresponding to the determined frequency and duration of the analog signals. Thus, it is in the indicia code register 80 that the final indicia code is produced.

FIG. 4 will be further explained in the case of a musical transcription system wherein successive single musical tones are provided as the analog inputs. A sample range of valid frequencies would correspond to the note E below middle C on the low end of the range and C three octaves above middle C on the high end of the range. The E on the low end of the range would have a count corresponding to the number of zero crossings of the analog signal corresponding to this frequency during 1/10th of a second. Counts of a value below this count would be invalid because they would correspond to musical notes below the note E. Similarly, notes having frequencies above C three octaves above middle C would be detected to be invalid because their counts produced during 1/10th of a second would be greater than the count produced for that C note during 1/10th of a second.

If a frequency corresponding to a musical tone is determined to fall within the acceptable range of frequencies, the count corresponding to the frequency is passed to the frequency correlator 64. In this example, the storage positions in the memory matrix 66 would correspond to the valid musical frequencies between E below middle C and C three octaves above it, inclusive. The frequency correlator 64, address controller 68 and memory matrix 66 operate in the previously described manner to produce a code corresponding to an idenified musical frequency.

This and successive codes are passed to the frequency comparator 70 and, as long as the same musical tone is sampled in 1/10th of a second intervals, the duration counter will be incremented once for sample. Thus, the indicia code register 80 is supplied with the frequency of the musical tone as well as a count corresponding to the number of consecutive samples of this same tone. The indicia code register 80 produces an indicia code identifying the frequency to be, for example, middle C with a duration, for example, of a half note.

Further referring to FIG. 4, the indicia codes are provided as input to the means for printing indicia representing the indicia codes on a record medium. As embodied herein, the printing means comprises printer control 82 coupled to indicia matrix 84 and printer 86. The printer control 82 upon receiving an indicia code actuates print elements in printer 86 to produce images of the indicia corresponding to the indicia code on a record medium, i.e., printed output, 88. One type of printer particularly adapted to such an application is a dot matrix printer wherein the printer control 82 would cooperate with an indicia matrix 84 to actuate the proper print members within the printer at proper times to produce the indicia, as a composite of dots, on the record member 88. Printers which are capable of producing indicia corresponding to indicia codes on an output medium are well-known and a particular printer for producing the visible images would often depend upon the nature of the images being produced.

Figure 5:
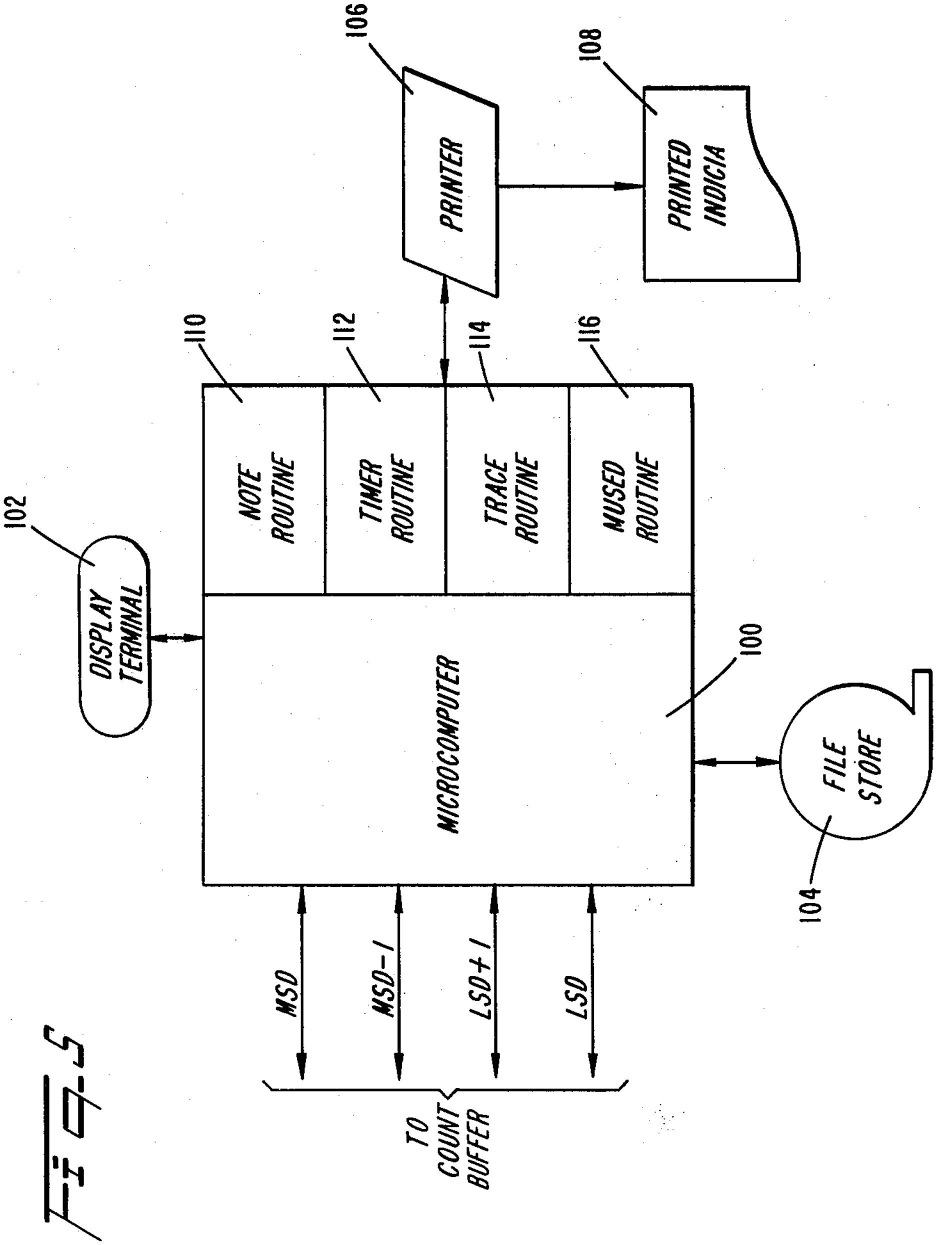
FIG. 5 shows a microcomputer embodiment of the frequency identifier, duration identifier, and indicia code generator of FIG. 1 in accordance with the present invention.

FIG. 5 shows the preferred embodiment for the means for producing the series of indicia codes corresonding to the series of digital signals. As embodied herein, the means comprises a programmed microcomputer 100 coupled to display terminal 102, storage device, such as file store 104, and printer 106. The microcomputer 100 receives the counts from the count buffer over lines labeled MSD, MSD−1, LSD+1 and LSD. The microcomputer 100 processes the count under programmed control and controls the printer 106 to print on output medium 108 the indicia corresponding to the input analog signals. A suitable microcomputer 100 is the ALTAIR 8800B microcomputer. A suitable display terminal 102 is a Lear Seigler ADM3A cathode ray terminal and the data storage device 104 could be tape or disc units.

The microcomputer 100, in addition to having its normal operating system program, is programmed with at least the following subprograms: NOTE subroutine 110 embodying the means for determining the frequency of the analog signals, TIMER subroutine 112 embodying the means for determining the duration of the analog signals and TRACE subroutine 114 embodying the means for generating the indicia codes and for controlling the printer 106 to produce the indicia on the record medium 108. The MUSED subroutine 116 is provided as an optional routine to edit the indicia codes under operator control.

The Appendix which constitutes a part of this Specification includes sample subprograms coded in the assembly language for the 8800 microcomputer for implementing each of the subroutines 110-116 that control the function of the microcomputer 100 to process the analog signals. It is understood that one skilled in the art could program other suitable computers to perform the processes of the exemplar subroutines.

The particular subprograms are coded to accept as inputs successive single tone musical notes, and produce written sheet music as the output. The microcomputer 100 configured with the subroutines 110-116 is equipped to process successive musical tones within the following constraints:

(a) The musical tones are produced by a musical instrument or a steady voice, (b) The tempo of the musical tones is such that there are 60 quarter notes to one minute, (c) The musical tones have a minimum duration of a sixteenth note, (d) The successive tones are within a range of E below middle C and within three octaves above middle C. This corresponds to frequencies between 174 Hz and 1,310 Hz.

(e) The musical tones are produced with clean attacks; and (f) The timer 52 is set to transfer a count from a pulse counter 48 to the count buffer 50 every 1/10th sec.

The NOTE subroutine is reproduced on pages A1 to A14 and includes an interrupt-driven input routine designed to input three Binary Coded Decimal (BCD) digits at every 1/10th second interval from program execution until a signal is received via the display terminal 102 indicating that the input should be halted. Then, the BCD data is converted to Frequency Divided by Ten (FDT) data.

When the analog signal transcriber is actuated, the VINIT section of code (instructions 1;069-1;097) retrieves and saves the Operating System reentry point, communicates with the display terminal 102, and enables system interrupts. A system interrupt comprises the transfer of the four BCD digits, MSD-LSD, from the count buffer 50 to the microprocessor 100. In the case of musical tones, the first digit, MSD, is discarded because any count attained by the pulse counter 48 during 1/10th of a second which would cause the MSD to assume a value other than zero would be invalid over the frequency range of the musical tones, i.e., 174 Hz to 1,310 Hz. After discarding the MSD, the other three digits, MSD−1 to LSD, are stored in sequential ascending memory locations in the microcomputer 100 beginning at address 1000 (hexadecimal). When the three BCD digits have been stored, the interrupts are re-enabled and the microprocessor 100 waits until the next interrupt is received.

The interrupt/wait loop is exited by entering any character into the display terminal 102 while the loop is executing. The routine CABOR (starting at instruction 1;100) determines whether a key has been struck on the display terminal 102 requesting an exit from the interrupt loop. If an exit has been requested, the code labeled THX (instruction 1;108) is performed to retrieve the BCD digits, three at a time, from the memory locations in the microprocessor 100 to place them into temporary storage areas. The subroutine RECOG is then executed wherein the first BCD digit is multiplied by 100 and saved in a register. The second BCD digit is multiplied by 10 added to the value of the first BCD digit multiplied by 100. This sum is placed in the same register and has added to it the value of the third BCD digit. This final sum is then stored in sequential memory locations beginning at address 6000 (hexadecimal).

Upon a return from executing RECOG, a check is made to see if all BCD digits have been processed. If not, the next three digits are passed to RECOG for processing and processing continues until all of the three digit sets of BCD digits have been processed and stored. At this point, the data stored at sequential memory locations beginning at address 6000 correspond to the frequencies of the musical tones provided as inputs to the analog transcriber system. That is, the value stored at each memory location is equal to the count obtained in the pulse counter 48 during 1/10th of a second and such counts are representative of the characteristic frequencies of the input musical tones.

After the NOTE subroutine has identified the characteristic frequency for each 1/10th of a second sample of the musical tones provided as inputs, the TIMER subroutine is entered for the purpose of determining the duration of each characteristic frequency. While the frequencies of musical tones are characterized by the notes in the musical scale, the duration of musical tones is characterized by how long each particular note is held. The duration is commonly described in terms of whole notes, half notes, quarter notes, eighth notes, etc. The duration of a quarter note is dependent upon the tempo at which the musical tones are played and in the case of a tempo of 60 beats per minute a quarter has a duration of 1 second. Thus, in order to identify the quarter note at a particular characteristic frequency, the pulse counter 48 must supply 10 successive counts of the same frequency to the count buffer 50. The microprocessor 100, upon receiving these counts from the count buffer 50, identifies that 10 successive counts of the same frequency have been received and then generates an indicia code characterizing the musical tone as having a particular identified frequency and a duration of a quarter note. Determining the duration of a musical tone and producing an indicia code representing the duration is a function of the TIMER subroutine. This subroutine is found at pages A15–A18.

Upon initial execution, TIMER sets up the entry point into the Operating System and the entry points for use with the display terminal 102. The instructions beginning with TMAIN (instruction 1;043) begin the main processing of the TIMER subroutine. The characteristic frequencies previously determined by the NOTE subroutine and stored at beginning at address 6000 (HEX) are fetched from memory and placed in both the accumulator of the microcomputer 100 for processing and in the B register of the microcomputer 100 for temporary storage and comparison operations. The C register is used to count how many bytes of identical data pass into the accumulator in sequence. The index pointer to the address of the characteristic frequency is incremented and the next three digit frequency is placed into the accumulator. A comparison is made between the previous frequency and the current frequency and, if they are identical in value, the C register is incremented. The CHEK subprogram is performed to see if all of the characteristic frequencies have been processed.

If two successive values of the characteristic frequencies are not identical, then two different notes are represented. The previous note value is stored in memory and further processed by the operations beginning at CL1 to determine the duration of the musical tone in musical terms. This is done in the following manner. Knowing that the tone samples represent 10th second intervals and based on a tempo of 60 quarter notes per minute, if the value obtained in the C register is $40_{10}$ or greater, the note is at least a whole note in duration. If the value is $40_{10}$ or greater, the value zero is placed in memory of the microcomputer one location higher than the note value and a further check is made to see if there is another whole note worth of data in the C register. If there is not, control is passed to CL2 which in like manner by substituting $20_{10}$ for $40_{10}$ checks for a half note. Control will then pass to CL3 which by substituting $10_{10}$ for $20_{10}$ checks for a quarter note. CL4 substitutes $5_{10}$ for $10_{10}$ and checks for an eighth note. Finally, CL5 checks for sixteenth notes by using a $3_{10}$ value for comparison. At RETR (instruction 1;101) the C register is reset, data and indices are restored and the next note is processed. This continues until all data representing characteristic frequencies previously stored by the NOTE subroutine have been processed. An exit is made from TIMER through the CHEK subroutine.

After the TIMER has generated the indicia codes identifying the frequency and duration of the musical tones provided as inputs to the analog transcriber system, the TRACE subroutine is performed to accept as its input the indica codes and cause the system printer 106 to produce on the output medium 108 the print staves and notes corresponding to the musical tones. Upon intitialization the Operating System reentry points are obtained and saved, the line printer driver is initialized with a call to the NWBFR subroutine (instruction 5;013), the beginning address of the stored indicia codes is obtained, and the instructions beginning at LINE1 (instruction 1;120) are executed. The code labeled LINE1 causes a pointer to the indicia codes in the memory of the microcomputer 100 to be placed in the D, E register pair of the microcomputer and the registers in the B, C register pair of the microcomputer are set up as musical staff location counters. The first indicia code is fetched as pointed to by the D, E registers and is examined to see if it has been processed. This is done by checking the MSD which is normally zero, but is set to one if that indicia code has been processed. If the indicia code has not been processed and the value of the indicia code indicates that its associated musical tone does not belong on line 1 of the staff, the pointers in the D, E register pair are incremented and the next indicia code is fetched and processed.

Twenty-four consecutive notes are processed in this fashion. If the value of the indicia code indicates that its associated musical tone does belong on line 1 of the staff, it is flagged as processed by the MPY routine (instruction 4;031). A call is then made to the ACTIV routine (instruction 4;018) to activate a storage position in the staff storage area corresponding to the position that the note is to have on the musical staff and to select and flag the appropriate font, i.e., whole note, half note, quarter note, etc., to be printed in that location on the staff.

After twenty-four consecutive indicia codes have been checked, control passes to LINE2 (instruction 1;156) which performs similar operations with the indicia codes to determine if any of the musical tones associated with twenty-four indicia codes belong on line 2 of the staff. This mode of processing continues until all twenty-four indicia codes have been checked for possible positioning on any one of the twelve lines and spaces of musical staff.

The next phase of the TRACE subroutine actually places the proper fonts into the storage locations in the staff storage area (instruction 3;044). Three pointers are set up to three staff lines and the note fonts are set up as a three by three memory matrix. The registers in the B, C register pair of the microcomputer 100 point to the flagged notes and a call to the subroutine MOVE1 (instruction 4;059) places the note fonts in the storage positions in the staff storage matrix. When three staff lines have been processed, the staff pointers are shifted to point to the next three staff lines and the second line of flagged fonts is stored in their proper positions in the staff storage matrix. This processing is repeated for 12 staff lines covering the entire staff so that one staff of 24 notes corresponding to 24 musical tones is set up in the memory of the microprocessor 100.

At this time, the register in the D, E register pair point to the first locatin in the staff storage matrix. The registers in the B, C register pair are set up as counters. Finally, the entire staff is printed by the printer 106 by a call to PRINT (instruction 4;141). When the values stored in the B, C register pair are decremented to zero, the entire staff has been printed and the loop PLOP2 (instruction 3;181) falls through to the section of instructions which loads the current pointer in memory into the D, E register pair and the address of the last indicia code in the H, L register pair. The values in the register pairs are compared and an exit to the Operating System is performed if the values are equal. If the values are unequal, program control is transferred to NWSTF (instruction 1;042) and a new staff is processed. The processing continues in this manner until all of the indicia codes stored in the memory of the microcomputer 100 have been processed and the indicia corresponding to the stored indicia codes have been printed on output record 108 by printer 106.

The final subroutine executed by microprocessor 100 is the MUSED subroutine 116. This subroutine is an optional editor used to modify indicia code for the TIMER and TRACE subroutines. The code for the MUSED subroutine is found at pages A47–A65 of the appendix. The MUSED subroutine initially obtains and stores the Operating System reentry address and then sets up entry points to the Operating System terminal I/O routines. The MUSED subroutine is intended to permit a person operating the analog signal transcribing system to edit the indicia codes generated by means of instructions entered through the display terminal 102 to the microprocessor 100.

The code at TMAIN (instruction 1;049) represents the top of the main operating loop in MUSED and at this point of operation a header line is printed on the system terminal 102. The beginning address of the characteristic frequencies stored by the NOTE subroutine is then loaded into the D, E register pair of the microprocessor 100 for use as an index for addressing each characteristic frequency. A call is made at this point to the TYPER routine (instruction 2;136) to determine the note type corresponding to the characteristic frequency pointed to by the D, E register pair. A note type is, for example, A, A#, B, C, etc. A call is then made to the TIMER subroutine to determine the duration of the characteristic frequency being processed, i.e., whole note, half note, quarter note, etc. This information is then displayed on the display terminal 102 by the TNOUA routine found at instruction 1;182.

At this point, the user is then solicited to input an edit command to determine the MUSED subroutine's next course of action. There are three possible courses of action: 1. CONTINUE If the user enters C(ONTINUE), the next characteristic frequency will be processed and its frequency and duration printed on the display terminal 12.

2. QUIT

If the user enters Q(UIT), the low address of the characteristic frequencies stored in the memory of the microcomputer 100, the high address of the characteristic frequencies, the number of indicia codes modified and the number of characteristic frequencies scanned are printed on the display terminal 102. Reentry is made into the Operating System, and execution of the musical tone transcribing system is terminated.

3. MODIFY

If the user enters M(ODIFY), the code starting at MODIF (instruction 1;;25) is performed and the user is requested to enter an indicia code to replace the indicia code currently being processed. The indicia code is input in the form of, for example, A5, A5#, etc. (indicating A in octave 5, A# indicating A# in octave 5, etc.). The indicia code entered from the display terminal 102 is parsed, for example, into A-5-# via the NOINP routine (instruction 1;239). After the note value is parsed, it is assigned an indicia code of 1–37 to correspond to its frequency within the valid frequency range and the indicia code replaces the prior code for that particular note in the series of notes processed by the analog signal transcriber. This is accomplished by the MDLOP code (instruction 1;133) and a return is made to TMAIN to give the user the opportunity to modify other indicia codes.

Figure 6:
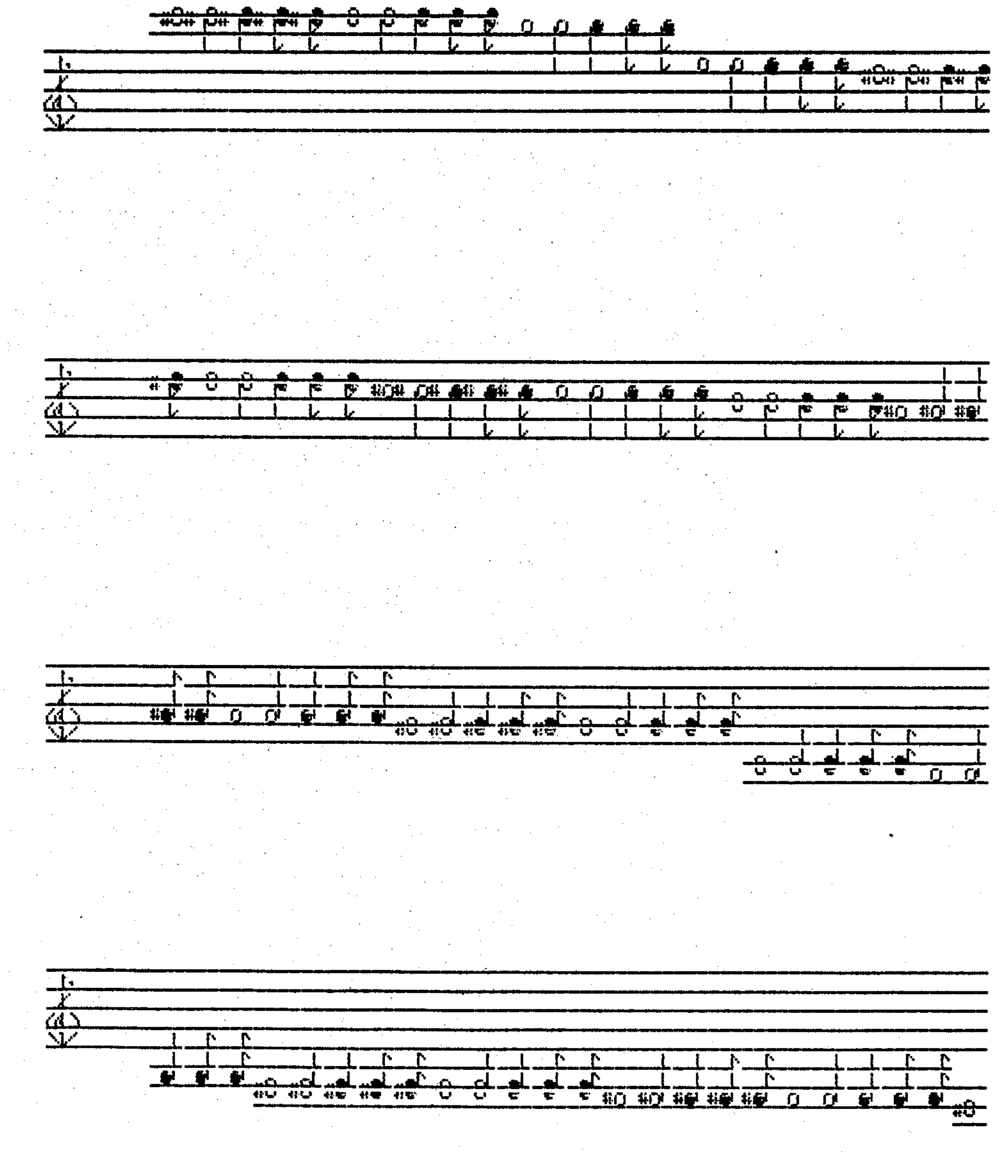
FIG. 6 is an example of the output of the transcriber system when it is used to translate musical tones into written musical notes.

FIG. 6 depicts an example of the output of the transcriber system when it is employed to translate audio tones into musical notes.

It will be apparent to one skilled in the art that applicant has described a system for translating a series of analog signals having characteristic frequencies and durations into written indicia representing the signals. The system comprises a means for converting the analog signals into a corresponding series of electrical signals having characteristic frequencies and durations. As described herein, the converting means comprises an element for producing continuous electrical signals having successive transitions from positive values to negative values through a zero value. A suitable converting means in the instances where successive, individual musical tones comprise the analog signals is a microphone and an amplifier. The translating system further includes means for generating a series of digital signals corresponding to the electrical signals and reflecting both the characteristic frequencies and durations of the analog signals and for counting the number of digital signals occurring in the series of digital signals during predetermined time intervals. As discussed herein, the means for generating and counting comprises a comparator circuit for producing a digital output corresponding to the electrical input; two dual monostable multivibrators for producing a digital pulse for each leading edge and each trailing edge of the digital signals produced by the comparator; a NOR gate for combining the digital pulses produced by the two dual monostable multivibrators into a digital pulse train; a pulse counter for counting the number of digital pulses in the digital pulse train; a pulse count buffer for storing the counts in the pulse counter; and a timer for transferring the count in the pulse counter at predetermined intervals to the count buffer. The timer also resets the count in the pulse counter so that the count of digital pulses in the pulse train is started from zero at the beginning of each predetermined time interval.

The translating system has also been described to include means for producing a series of indicia codes corresponding to the value of the counts stored in the count buffer wherein each such indicia code reflects the frequency and duration of one of the analog signals. The producing means has been embodied by two means. The first means is shown in FIG. 4 to include an invalid frequency detector for determining that the frequencies of the analog signals fall within a range which can be processed by the translating system; a frequency correlator for identifying the frequency of an analog signal from the count received from the count buffer and for addressing a memory matrix to access a code which corresponds to the identified frequency; a frequency comparator which identifies the duration of a particular frequency in the series of analog signals by counting the number of successively received identified frequencies which are the same and for incrementing a duration counter each time successively received frequencies are the same; and an indicia code register receiving the identified frequency and the identified duration to generate an indicia code corresponding thereto, each indicia code being described to completely identify both the frequency and the duration of an analog signal provided as input to the translating system. In the instance where the analog signals are musical tones, the indicia code has been described to indicate the frequency as a note in the musical scale and the duration of a musical tone as a whole note, half note, etc.

FIG. 5 has been disclosed as an alternative embodiment for the producing means. This embodiment includes a microcomputer receiving the counts from the count buffer, a display terminal, and appropriate storage devices. The microcomputer has been disclosed to be programmed with a NOTE subroutine a TIMER subroutine, a TRACE subroutine and a MUSED subroutine. Examples of program code for a specific microcomputer have been included as an Appendix and have been described herein.

The translating system has also been described to include a printing means for printing indicia representing the indicia code wherein each printed indicia identifies both the frequency and duration of a corresponding analog signal. In the case of musical tones, the printed indicia has been described to be sheet music.

It will be further apparent to those skilled in the art that various modifications and variations can be made in the translating system without departing from the scope or spirit of the invention. As an example, while musical tones have been used as an example of an analog signal, other audio signals such as those generated during the study of solid, liquid or gaseous mediums or other non-audio analog signals can be provided as input to the translating system for so long as the signals have characteristic frequencies and durations and the characteristic frequencies and durations can be uniquely identified by indicia codes. It is clear that such indicia codes could be arbitrarily assigned and not be merely the notes of a musical scale, Thus, it is intended that the present invention cover the modifications and variations of the system provided that they come within the scope of the appended claims and their equivalents.

```
**********************
*                    *
* NOTE INPUT ROUTINE *
*                    *
**********************
*
* ASSEMBLE TO EXECUTE FROM C040 (HEX) VIA
* OK--ASSM 0 0 3000
*
*
*
*
*
* 11/26/78    VER. 4.0
*

            ORG    0
            JMP    LEV2             RETURN FROM RTC INTERRUPT
            ORG    40H
            JMP    VINIT            INITIALIZE SYSTEM
TIN         JMP    TIN
OUTT        JMP    OUTT
CRLF        JMP    CRLF
TMAIN       CALL   CABOR
            MVI    A,0
            OUT    FCFD
            CALL   FDWO
            MVI    A,2
            OUT    FCFD
            EI                      ENABLE INTERRUPTS
            MVI    A,0B0H
```

```
        OUT   ODFH
LOOP    NOP
        JMP   LOOP
LEV2    POP   H
        MVI   A,6                 STOP THE PCFD AND...
        OUT   PCFD
        CALL  FDW6
        MVI   A,7
        OUT   PCFD
        CALL  FDW7
        MVI   A,6
        OUT   PCFD
        CALL  FDW6
        MVI   A,7
        OUT   PCFD

        CALL  FDIN                GET DIGIT #2
        STAX  D
        INX   D
        MVI   A,6
        OUT   PCFD
        CALL  FDW6
        MVI   A,7
        OUT   PCFD
        CALL  FDIN                GET DIGIT #3
        STAX  D
        INX   D
        MVI   A,6
        OUT   PCFD
        CALL  FDW6
        MVI   A,7

        OUT   PCFD
        CALL  FDIN                GET DIGIT #4
        STAX  D
        INX   D
        JMP   TMAIN
*
* VI/RTC INITIALIZATION ROUTINE
*
VINIT   POP   H                     FETCH OS RETURN ADDRESS
        SHLD  REENT
        LXI   D,3
        DAD   D
        SHLD  TIN+1
        DAD   D
        SHLD  OUTT+1

        DAD   D
        SHLD  CRLF+1
        CALL  CRLF                SET UP SCREEN
        LXI   D,GODBF
        CALL  TNOUA
        LXI   D,SBUF1
        CALL  TNOUA
        LXI   D,1000H
        CALL  TIN
        MVI   A,2                 RESET AND CLEAR PCFD
        OUT   PCFD
        CALL  FDW2
        MVI   A,0
```

```
        OUT   PCFD
        CALL  FDWO
        MVI   A,2
        OUT   PCFD
        EI                          ENABLE INTERRUPTS
        MVI   A,0F0H
        OUT   0DFH
        JMP   LOOP
*
* KEYBOARD INTERRUPT ROUTINE
*
CABOR   IN    16
        ANI   1
        RZ                          RETURN IF NO KEYBOARD INPUT
        IN    17
        CALL  CRLF                  ELSE TERMINATE
        LXI   B,1000H
        LXI   H,6000H
        XCHG
THX     LDAX  B
        STA   D1
        INX   B
        LDAX  B
        STA   D2
        INX   B
        LDAX  B
        STA   D3
        INX   B
        CALL  RECOG
        MOV   A,B
        CMP   H
        JNZ   THX
        MOV   A,C
        CMP   L
        JNZ   THX
        SHLD  BCDHI                 SAVE HIGH ADDRESS OF BCD DATA
        XCHG
        SHLD  NOTHI                 LIKEWISE FOR NOTE DATA
        LHLD  BCDHI                 SET UP FOR COMPUTATIONS
        SHLD  SUB01                 ...TO DETERMINE NUMBER...
        LHLD  BCLOW                 ...OF BCD DIGITS SAVED...
        SHLD  SUB02
        MVI   E,2
        CALL  MSUB
        LHLD  SUB01
        SHLD  BCSAV
        LHLD  NOTHI                 SET UP SAME COMPUTATION...
        SHLD  SUB01                 ...FOR NOTE DATA...
        LHLD  NOLOW
        SHLD  SUB02
        MVI   E,2
        CALL  MSUB
        LHLD  SUB01
        SHLD  NOSAV
        XCHG
```

```
LHLD BCSAV      ADD BOTH TOGETHER TO...
DAD  D          ...DETERMINE NUMBER OF BCD...
SHLD BCDIN      ...DIGITS INPUT--THEN SAVE
LXI  D,CODDF
CALL TNOUA
LXI  D,EBUF1    SET UP FOR PRETTY SCREEN TERMINATION
CALL TNOUA

LHLD BCLOW
MOV  A,H
CALL HXOUT
MOV  A,L
CALL HXOUT
LXI  D,EBUF2
CALL TNOUA
LHLD NOLOW
MOV  A,H
CALL HXOUT
MOV  A,L
CALL HXOUT
LXI  D,EBUF3
CALL TNOUA
LHLD BCDHI

MOV  A,H
CALL HXOUT
MOV  A,L
CALL HXOUT
LXI  D,EBUF4
CALL TNOUA
LHLD NOTHI
MOV  A,H
CALL HXOUT
MOV  A,L
CALL HXOUT
LXI  D,EBUF5
CALL TNOUA
LHLD BCDIN
MOV  A,H

CALL HXOUT
MOV  A,L
CALL HXOUT
LXI  D,EBUF6
CALL TNOUA
LHLD NOSAV
MOV  A,H
CALL HXOUT
MOV  A,L
CALL HXOUT
LXI  D,EBUF7
CALL TNOUA
LHLD BCSAV
MOV  A,H
CALL HXOUT

MOV  A,L
CALL HXOUT
LXI  D,EBUF8
CALL TNOUA
CALL CRLF
CALL CRLF
```

```
1;202       LHLD REENT          GET OS RETURN ADDRESS
1;203       PCHL                AND EXIT BACK TO OS
1;204 RECOG PUSH B
1;205       LDA  D1
1;206       CPI  3
1;207       JP   MAXN
1;208       CALL HMULT
1;209       MOV  B,A
1;210       XRA  A
1;211       LDA  D2
1;212       CALL TMULT
1;213       ADC  B
1;214       JC   MAXN
1;215       MOV  B,A
1;216       XRA  A
1;217       LDA  D3
1;218       ADC  B
1;219       JC   MAXN
1;220       STA  INTER
1;221       JMP  RECON
1;222 MAXN  MVI  A,OFFH
1;223       STA  INTER
1;224 RECON LDA  INTER
1;225       CPI  99
1;226       JP   NX21
1;227       CPI  39
1;228       JP   NX5
1;229       MVI  A,0
1;230       JMP  BACK
1;231 NX5   CPI  43
1;232       JP   NX6
1;233       MVI  A,5
1;234       JMP  BACK
1;235 NX6   CPI  45
1;236       JP   NX7
1;237       MVI  A,6
1;238       JMP  BACK
1;239 NX7   CPI  47
1;240       JP   NX8
1;241       MVI  A,7
1;242       JMP  BACK
1;243 NX8   CPI  51
1;244       JP   NX9
1;245       MVI  A,8
1;246       JMP  BACK
1;247 NX9   CPI  53
1;248       JP   NX10
1;249       MVI  A,9
1;250       JMP  BACK
2;001 NX10  CPI  57
2;002       JP   NX11
2;003       MVI  A,10
2;004       JMP  BACK
2;005 NX11  CPI  60
2;006       JP   NX12
2;007       MVI  A,11
2;008       JMP  BACK
2;009 NX12  CPI  63
```

```
2;010         JP    NX13
2;011         MVI   A,12
2;012         JMP   BACK
2;013 NX13    CPI   67
2;014         JP    NX14
2;015         MVI   A,13
2;016         JMP   BACK
2;017 NX14    CPI   71
2;018         JP    NX15
2;019         MVI   A,14
2;020         JMP   BACK
2;021 NX15    CPI   75
2;022         JP    NX16
2;023         MVI   A,15
2;024         JMP   BACK
2;025 NX16    CPI   79
2;026         JP    NX17
2;027         MVI   A,16
2;028         JMP   BACK
2;029 NX17    CPI   85
2;030         JP    NX18
2;031         MVI   A,17
2;032         JMP   BACK
2;033 NX18    CPI   89
2;034         JP    NX19
2;035         MVI   A,18
2;036         JMP   BACK
2;037 NX19    CPI   93
2;038         JP    NX20
2;039         MVI   A,19
2;040         JMP   BACK
2;041 NX20    CPI   99
2;042         JP    NX21
2;043         MVI   A,20
2;044         JMP   BACK
2;045 NX21    CPI   106
2;046         JP    NX22
2;047         MVI   A,21
2;048         JMP   BACK
2;049 NX22    CPI   111
2;050         JP    NX23
2;051         MVI   A,22
2;052         JMP   BACK
2;053 NX23    CPI   119
2;054         JP    NX24
2;055         MVI   A,23
2;056         JMP   BACK
2;057 NX24    CPI   126
2;058         JP    NX25
2;059         MVI   A,24
2;060         JMP   BACK
2;061 NX25    CPI   133
2;062         JP    NX26
2;063         MVI   A,25
2;064         JMP   BACK
2;065 NX26    CPI   139
2;066         JP    NX27
2;067         MVI   A,26
2;068         JMP   BACK
2;069 NX27    CPI   149
2;070         JP    NX28
2;071         MVI   A,27
2;072         JMP   BACK
2;073 NX28    CPI   159
2;074         JP    NX29
2;075         MVI   A,28
2;076         JMP   BACK
2;077 NX29    CPI   167
2;078         JP    NX30
2;079         MVI   A,29
2;080         JMP   BACK
2;081 NX30    CPI   179
2;082         JP    NX31
2;083         MVI   A,30
2;084         JMP   BACK
2;085 NX31    CPI   188
2;086         JP    NX32
2;087         MVI   A,31
2;088         JMP   BACK
2;089 NX32    CPI   199
2;090         JP    NX33
2;091         MVI   A,32
2;092         JMP   BACK
2;093 NX33    CPI   211
2;094         JP    NX34
2;095         MVI   A,33
2;096         JMP   BACK
2;097 NX34    CPI   225
2;098         JP    NX35
2;099         MVI   A,34
2;100         JMP   BACK
2;101 NX35    CPI   235
2;102         JP    NX36
2;103         MVI   A,35
2;104         JMP   BACK
2;105 NX36    CPI   249
2;106         JP    NX37
2;107         MVI   A,36
2;108         JMP   BACK
2;109 NX37    MVI   A,37
2;110 BACK    STAX  D
2;111         INX   D
2;112         POP   B
2;113         RET
2;114 *
2;115 * MULTIPLY ACCUMULATOR BY 100
2;116 *
2;117 HMULT   CPI   0
2;118         RZ
2;119         PUSH  B
2;120         MOV   B,A
2;121         XRA   A
2;122 HMLOP   ADI   100
2;123         DCR   B
2;124         JNZ   HMLOP
2;125         POP   B
```

```
2;126        RET
2;127 *
2;128 * MULTIPLY ACCUMULATOR BY 10
2;129 *
2;130 TMULT CPI   0
2;131       RZ
2;132       PUSH B
2;133       MOV  B,A
2;134       XRA  A
2;135 TMLOP ADI  10
2;136       DCR  B
2;137       JNZ  TMLOP
2;138       POP  B
2;139       RET
2;140 *
2;141 * PCFD INPUT ROUTINES
2;142 *
2;143 FDW0  IN   PCFD
2;144       CMA
2;145       ANI  70H
2;146       CPI  70H
2;147       RZ
2;148       JMP  FDW0
2;149 FDW2  IN   PCFD
2;150       ANI  20H
2;151       CPI  20H
2;152       RZ
2;153       JMP  FDW2
2;154 FDW6  IN   PCFD
2;155       ANI  60H
2;156       CPI  60H
2;157       RZ
2;158       JMP  FDW6
2;159 FDW7  IN   PCFD
2;160       ANI  70H
2;161       CPI  70H
2;162       RZ
2;163       JMP  FDW7
2;164 FDIN  IN   PCFD
2;165       MOV  C,A
2;166       ANI  70H
2;167       CPI  70H
2;168       JNZ  FDIN
2;169       MOV  A,C
2;170       ANI  0FH
2;171       RET
2;172 *
2;173 * HEX OUT TO TERMINAL ROUTINE
2;174 *
2;175 HXOUT PUSH M
2;176       RRC
2;177       RRC
2;178       RRC
2;179       RRC
2;180       CALL HOUT
2;181       POP  M
2;182 HOUT  ANI  0FH
2;183       ADI  30H
2;184       CPI  3AH
2;185       JM   HGO
2;186       ADI  7
2;187 HGO   CALL OUTT
2;188       RET
2;189 *
2;190 * MULTIBYTE ADDITION ROUTINE
2;191 *
2;192 MADD  PUSH M
2;193       PUSH H
2;194       PUSH D
2;195       PUSH B
2;196       LXI  B,ADD01
2;197       LXI  H,ADD02
2;198       XRA  A
2;199 MALOP LDAX B
2;200       ADC  M
2;201       STAX B
2;202       DCR  E
2;203       JZ   MADDX
2;204       INX  B
2;205       INX  H
2;206       JMP  MALOP
2;207 MADDX POP  B
2;208       POP  D
2;209       POP  H
2;210       POP  M
2;211       RET
2;212 *
2;213 * MULTIBYTE SUBTRACTION ROUTINE
2;214 *
2;215 MSUB  PUSH M
2;216       PUSH H
2;217       PUSH D
2;218       PUSH B
2;219       LXI  B,SUB01
2;220       LXI  H,SUB02
2;221       XRA  A
2;222 MSLOP LDAX B
2;223       SBB  M
2;224       STAX B
2;225       DCR  E
2;226       JZ   MSUBX
2;227       INX  B
2;228       INX  H
2;229       JMP  MSLOP
2;230 MSUBX POP  B
2;231       POP  D
2;232       POP  H
2;233       POP  M
2;234       RET
2;235 *
2;236 * TERMINAL BUFFER OUTPUT ROUTINE
2;237 *
2;238 TNOUA LDAX D
2;239       MOV  B,A
2;240 TNLOP INX  D
2;241       LDAX D
2;242       CALL OUTT
2;243       DCR  B
```

```
2;244         JNZ  TNLOP
2;245         RET

2;246 *
2;247 *
2;248 * MAIN STORAGE AREA
2;249 *
2;250 *
3;001 INTER DW    0000
3;002 PCFD  EQU   0
3;003 FDTMP DB    1
3;004 TXTMP DB    1
3;005 D1    DB    1
3;006 D2    DB    1
3;007 REENT DW    0000
3;008 D3    DB    1
3;009 BCLOW DW    1000H
3;010 BCDHI DW    0000

3;011 NOLOW DW    6000H
3;012 NOTHI DW    0000
3;013 BCSAV DW    0000
3;014 NOSAV DW    0000
3;015 BCDIN DW    0000
3;016 SUB01 DW    0000
3;017 SUB02 DW    0000
3;018 ADD01 DW    0000
3;019 ADD02 DW    0000
3;020 GODBF DB    8
3;021       DB    1AH
3;022       DW    3D1BH
3;023       DW    'E '
3;024       DW    'OG'
3;025       DB    'D'

3;026 SBUF1 DB    153
3;027       DW    0D0DH
3;028       DW    0D0DH
3;029       DW    'OG'
3;030       DW    ' D'
3;031       DW    'LB'
3;032       DW    'SE'
3;033       DW    ' S'
3;034       DW    'OY'
3;035       DW    '.U'
3;036       DB    0DH
3;037       DW    'HT'
3;038       DW    'SI'
3;039       DW    'I '
3;040       DW    ' S'

3;041       DW    'HT'
3;042       DW    ' E'
3;043       DW    'UA'
3;044       DW    'OT'
3;045       DW    'AM'
3;046       DW    'IT'
3;047       DW    ' C'
3;048       DW    'UM'
3;049       DW    'IS'
3;050       DW    ' C'
3;051       DW    'RT'
3;052       DW    'NA'
3;053       DW    'CS'
3;054       DW    'IR'
3;055       DW    'EB'

3;056       DW    ' R'
3;057       DW    'ON'
3;058       DW    'ET'
3;059       DW    'I '
3;060       DW    'FN'
3;061       DW    'TU'
3;062       DW    'R '
3;063       DW    'UO'
3;064       DW    'IT'
3;065       DW    'EN'
3;066       DW    'V '
3;067       DW    'RE'
3;068       DW    'IS'
3;069       DW    'NO'
3;070       DW    '4 '

3;071       DW    'O.'
3;072       DW    0D0DH
3;073       DW    'ER'
3;074       DW    'DA'
3;075       DW    ' Y'
3;076       DW    'OT'
3;077       DW    'B '
3;078       DW    'GE'
3;079       DW    'NI'
3;080       DW    'N '
3;081       DW    'TO'
3;082       DW    ' E'
3;083       DW    'NI'
3;084       DW    'UP'
3;085       DW    '.T'

3;086       DW    0D0DH
3;087       DW    'NE'
3;088       DW    'ET'
3;089       DW    ' R'
3;090       DW    ' A'
3;091       DW    'AC'
3;092       DW    'RR'
3;093       DW    'AI'
3;094       DW    'EG'
3;095       DW    'R '
3;096       DW    'TE'
3;097       DW    'RU'
3;098       DW    ' N'
3;099       DW    'OT'
3;100       DW    'B '

3;101       DW    'GE'
3;102       DW    'NI'
3;103       DW    ' .'
3;104 EBUF1 DB    32
3;105       DW    0D0DH
3;106       DW    0D0DH
3;107       DW    '  '
3;108       DW    'L '
3;109       DW    'WO'
```

```
3;110        DW   'A '
3;111        DW   'DD'
3;112        DW   'ER'
3;113        DW   'SS'
3;114        DW   'O '
3;115        DW   ' F'

3;116        DW   'CB'
3;117        DW   ' D'
3;118        DW   'AD'
3;119        DW   'AT'
3;120        DW   ' :'
3;121 EBUF2  DB   34
3;122        DW   '  '
3;123        DW   '  '
3;124        DW   '  '
3;125        DW   '  '
3;126        DW   'OL'
3;127        DW   ' W'
3;128        DW   'DA'
3;129        DW   'RD'
3;130        DW   'SE'

3;131        DW   ' S'
3;132        DW   'FO'
3;133        DW   'N '
3;134        DW   'TO'
3;135        DW   ' E'
3;136        DW   'AD'
3;137        DW   'AT'
3;138        DW   ' :'
3;139 EBUF3  DB   30
3;140        DW   0D0DH
3;141        DW   '  '
3;142        DW   'IH'
3;143        DW   'HG'
3;144        DW   'A '
3;145        DW   'DD'

3;146        DW   'ER'
3;147        DW   'SS'
3;148        DW   'O '
3;149        DW   ' F'
3;150        DW   'CB'
3;151        DW   ' D'
3;152        DW   'AD'
3;153        DW   'AT'
3;154        DW   ' :'
3;155 EBUF4  DB   34
3;156        DW   '  '
3;157        DW   '  '
3;158        DW   '  '
3;159        DW   'H '
3;160        DW   'GI'

3;161        DW   ' H'
3;162        DW   'DA'
3;163        DW   'RD'
3;164        DW   'SE'
3;165        DW   ' S'
3;166        DW   'FO'
3;167        DW   'N '
3;168        DW   'TO'
3;169        DW   ' E'
3;170        DW   'AD'
3;171        DW   'AT'
3;172        DW   ' :'
3;173 EBUF5  DB   30
3;174        DW   0D0DH
3;175        DW   'UN'

3;176        DW   'BM'
3;177        DW   'RE'
3;178        DW   'O '
3;179        DW   ' F'
3;180        DW   'CB'
3;181        DW   ' D'
3;182        DW   'ID'
3;183        DW   'IG'
3;184        DW   'ST'
3;185        DW   'I '
3;186        DW   'FN'
3;187        DW   'TU'
3;188        DW   ' :'
3;189 EBUF6  DB   34
3;190        DW   '  '

3;191        DW   '  '
3;192        DW   'UN'
3;193        DW   'BM'
3;194        DW   'RE'
3;195        DW   'O '
3;196        DW   ' F'
3;197        DW   'ON'
3;198        DW   'ET'
3;199        DW   'S '
3;200        DW   'MA'
3;201        DW   'LP'
3;202        DW   'SE'
3;203        DW   'T '
3;204        DW   'KA'
3;205        DW   'NE'

3;206        DW   ' :'
3;207 EBUF7  DB   30
3;208        DW   0D0DH
3;209        DW   'UN'
3;210        DW   'BM'
3;211        DW   'RE'
3;212        DW   'O '
3;213        DW   ' F'
3;214        DW   'CB'
3;215        DW   ' D'
3;216        DW   'ID'
3;217        DW   'IG'
3;218        DW   'ST'
3;219        DW   'S '
3;220        DW   'VA'

3;221        DW   'DE'
3;222        DW   ' :'
3;223 EBUF8  DB   106
3;224        DW   0D0DH
3;225        DW   0D0DH
```

```
        DW    0D0DH
        DW    '  '
        DW    '  '
        DW    '  '
        DW    '  '
        DW    '  '
        DW    '  '
        DW    '  '
        DW    '  '
        DW    '  '

        DW    '  '
        DW    '  '
        DW    '  '
        DW    '  '
        DW    'ON'
        DW    'ET'
        DW    'I '
        DW    'FN'
        DW    'TU'
        DW    'R '
        DW    'UO'
        DW    'IT'
        DW    'EN'
        DW    'V '
        DW    'RE'

        DW    '4 '
        DW    '0.'
        DW    0D0DH
        DW    '  '
        DW    '  '
        DW    '  '
        DW    '  '
        DW    '  '
        DW    '  '
        DW    '  '
        DW    '  '
        DW    '  '
        DW    '  '
        DW    '  '
        DW    '  '

        DW    '  '
        DW    '  '
        DW    '  '
        DW    '  '
        DW    'OG'
        DW    ' D'
        DW    'LB'
        DW    'SE'
        DW    ' S'
        DW    'OY'
        DW    '!U'
        END


EDIT--
$NOTE   3000   623E   633F
```

```
**********************
*                    *
* NOTE TIMER ROUTINE *
*                    *
**********************
*
* ASSEMBLE TO EXECUTE FROM A500 (HEX) VIA
* OK--ASSM A500 A500 0040
*
*
*
*
*
* 06/12/78---VER. 4.0
*

        JMP   START
TIN     JMP   TIN
OUTT    JMP   OUTT
CRLF    JMP   CRLF
START   POP   H
        SHLD  REENT
        LXI   D,3
        DAD   D
        SHLD  TIN+1
        DAD   D
        SHLD  OUTT+1
        DAD   D
        SHLD  CRLF+1
        CALL  CRLF
        CALL  CRLF

        MVI   B,22
        LXI   D,MSG1
        CALL  TNOUA
        CALL  TIHEX
        SHLD  TOPND
        CALL  CRLF
        LXI   H,1000H
        SHLD  INFEX
        LXI   H,6000H
        SHLD  INDEX
        XCHG
        MVI   C,1
TMAIN   LDAX  D
TM0     MOV   B,A
TM1     MOV   A,B

        INX   D
TM3     LDAX  D
        INX   D
        CMP   B
        JNZ   NEXN
        INR   C
        CALL  CHEK
        JMP   TM3
NEXN    XCHG
        SHLD  INDEX
        LHLD  INFEX
        XCHG
        MOV   L,A
CL1     MOV   A,B
        STAX  D
```

```
        INX   D
        MOV   B,A
        MOV   A,C
        CPI   40
        JM    CL2
        SUI   40
        MOV   C,A
        MVI   A,0
        STAX  D
        INX   D
        JMP   CL1
CL2     CPI   20
        JM    CL3
        SUI   20
        MOV   C,A
        MVI   A,1
        STAX  D
        INX   D
        JMP   CL1
CL3     CPI   10
        JM    CL4
        SUI   10
        MOV   C,A
        MVI   A,2
        STAX  D
        INX   D
        JMP   CL1
CL4     CPI   5
        JM    CL5
        SUI   5
        MOV   C,A
        MVI   A,3
        STAX  D
        INX   D
        JMP   CL1
CL5     CPI   3
        JM    RETP
        MVI   A,4
        STAX  D
        INX   D
RETR    XCHG
        SHLD  INFEX
        LHLD  INDEX
        XCHG
        MVI   C,1
        MOV   B,L
        JMP   TM3
RETP    DOX   B
        JMP   RETR
*
* SEE IF DONE YET
*
CHEK    PUSH  H
        PUSH  D
        PUSH  B
        PUSH  M
        LHLD  TOPND
        MOV   A,D
        CMP   H
        JM    RERTN
        MOV   A,E
        CMP   L
        JM    RERTN
        LHLD  INFEX
        XCHG
        MOV   A,D
        CALL  HXOUT
        MOV   A,E
        CALL  HXOUT
        CALL  CRLF
        LHLD  REENT
        PCHL
RERTN   POP   M
        POP   B
        POP   D
        POP   H
        RET
HXOUT   PUSH  M
        RRC
        RRC
        RRC
        RRC
        CALL  HOUT
        POP   M
HOUT    ANI   0FH
        ADI   30H
        CPI   3AH
        JM    HGO
        ADI   07
HGO     CALL  OUTT
        RET
*
* BUFFER OUTPUT TO TERMINAL
*
TNOUA   LDAX  D
        CALL  OUTT
        INX   D
        DCR   B
        JNZ   TNOUA
        RET
*
*INPUT 4 HEX VALUES FROM TERMINAL
*
TIHEX   LXI   H,0
        MVI   C,4
HXLOP   DAD   H
        DAD   H
        DAD   H
        DAD   H
        CALL  TIN
        SUI   30H
        CPI   0AH
        JM    HXOK
        SUI   7
HXOK    ADD   L
        MOV   L,A
        DCR   C
        JNZ   HXLOP
        RET
*
```

```
1;181 * DATA SECTION
1;182 *
1;183 MSG1  DW   'IH'
1;184       DW   'HG'
1;185       DW   'A '
1;186       DW   'DD'
1;187       DW   'ER'
1;188       DW   'SS'
1;189       DW   'O '
1;190       DW   ' F'
1;191       DW   'AD'
1;192       DW   'AT'
1;193       DW   ' :'
1;194 REENT DW   0000
1;195 INFEX DW   1000H

1;196 INDEX DW   6000H
1;197 INTMP DB   0
1;198 OTMP  DB   0
1;199 HXTMP DB   0
1;200 TMTMP DB   0
1;201 TOPND DW   0000
1;202       END
```

```
                ++  MECA OS VER. 3.0  ++


                 DRIVE 0   TEND=306A
NAME    BYTES   TLOC          NAME    BYTES   TLOC
$BCOS   4F59    0546          BMOS    1200    0C36
$EDIT   1C4F    0E08          EDITR   05EB    109D
$BDMP   0AE9    1178          BDMPR   0210    12B2
$DIRE   3753    1342          DIREC   0AFC    17A6
$DBUG   11FA    18D4          DEBUG   0377    1A7A
ASMBL   1200    1B1F          $MCOS   458A    1CBF
@40K0   0FEB    21B9          @32K0   1000    2327
@48K0   1000    2491          @24K0   1000    25F9
@56K0   1000    275D          DPRET   1400    28DE
BASIC   5168    2A5A          OS24K   1000    2F67
OK--LO @480
OK--LO $56K0 :0 AZ000
OK--LO $48K0 :0 A000


                ++  MECA OS VER. 3.0  ++
```

```
1;001 ***********************
1;002 *                     *
1;003 * NOTE PRINT ROUTINE  *
1;004 *                     *
1;005 ***********************
1;006 *
1;007 * ASSEMBLE TO EXECUTE FROM C000 (HEX) VIA
1;008 * OK--ASSM C000 C000 5000
1;009 *
1;010 *
1;011 *
1;012 *
1;013 *
```

```
* 06/10/78---VER. 4.0
*
* INITIALIZE SYSTEM
*
        JMP  TMAIN
TMAIN   POP  H
        SHLD REENT
        CALL CRLF
        CALL CRLF
        LXI  H,10H
        LXI  M,100H
        CALL NWBFR
        MVI  B,31
        LXI  D,SAMSG
        CALL TNOUA
        CALL HEXIN
        SHLD NONUM
        CALL CRLF
        MVI  B,29
        LXI  D,EAMSG
        CALL TNOUA
        CALL HEXIN
        SHLD ENDAD
        CALL CRLF
        CALL PRCR8
*
*     BLANK OUT THE STAVES
*
NWSTF   CALL PRCR8
        MVI  A,42
        LXI  D,LN1
        MVI  B,78
NWNW1   STAX D
        INX  D
        DCR  B
        JNZ  NWNW1
        MVI  B,104
        LXI  D,LN9
NWNW2   STAX D
        INX  D
        DCR  B
        JNZ  NWNW2
        MVI  A,41
        LXI  D,LN4
        MVI  B,130
NWLOP   STAX D
        INX  D
        DCR  B
        JNZ  NWLOP
        MVI  B,86
NWL01   STAX D
        INX  D
        DCR  B
        JNZ  NWL01
        MVI  A,'Y'
        LXI  D,STAF1
NWL02   MVI  B,243
NWL03   STAX D
```

```
        INX  D
        DCR  B
        JNZ  NWL03
        MVI  C,2
        LXI  D,STAF9
NWNW3   MVI  B,162
NWNW4   STAX D
        INX  D
        DCR  B
        JNZ  NWNW4
        DCR  C
        JNZ  NWNW3
        MVI  A,'X'
        LXI  D,STAF4
        MVI  C,5
NWNW5   MVI  B,81
NWNW6   STAX D
        INX  D
        DCR  B
        JNZ  NWNW6
        DCR  C
        JNZ  NWNW5
*
*     BUILD THE TREBLE CLEFF
*
        MVI  A,'!'
        STA  STAF5+1
        MVI  A,'"'
        STA  STAF5+2
        MVI  A,'#'
        STA  STAF6+1
        MVI  A,'$'
        STA  STAF6+2
        MVI  A,'%'
        STA  STAF7
        MVI  A,'&'
        STA  STAF7+1
        MVI  A,27H
        STA  STAF7+2
        MVI  A,'('
        STA  STAF8
        MVI  A,')'
        STA  STAF8+1
        MVI  A,'*'
        STA  STAF8+2
*
*     CHECK LINE 1 FOR NOTES
*
LINE1   LHLD NONUM
        XCHG
        MVI  C,1
        MVI  B,24
L1LOP   LDAX D
        CPI  80H
        JP   L1
        CPI  37
        JM   L1
        CPI  39
        JNZ  L2
        MVI  A,5
L4      CALL MPY
        PUSH H
        LXI  H,LN1
        CALL ACTIV
        DCX  D
        STAX D
        INX  D
        STAX D
        POP  H
        JMP  L9
L2      CPI  38
        JNZ  L3
        MVI  A,0
        JMP  L4
L3      MVI  A,10
        JMP  L4
L1      INX  D
L9      INX  D
        INR  C
        DCR  B
        JNZ  L1LOP
*
*     CHECK 2ND LINE AND SO ON
*
LINE2   LHLD NONUM
        XCHG
        MVI  C,1
        MVI  B,24
L2LOP   LDAX D
        CPI  80H
        JP   M1
        CPI  33
        JM   M1
        CPI  36
        JNZ  M2
        MVI  A,5
M8      CALL MPY
        PUSH H
        LXI  H,LN2
        CALL ACTIV
        DCX  D
        STAX D
        INX  D
        STAX D
        POP  H
        JMP  M9
M2      CPI  35
        JNZ  M3
        MVI  A,0
        JMP  M8
M3      CPI  34
        JNZ  M4
        MVI  A,15
        JMP  M8
M4      MVI  A,10
        JMP  M8
```

```
1,188 M1     INX  D
1;189 M9     INX  D
1;190        INR  C
1;191        DCR  B
1;192        JNZ  L2LOP
1;193 *
1;194 LINE3  LHLD NONUM
1;195        XCHG
1;196        MVI  C,1
1;197        MVI  B,24
1;198 L3LOP  LDAX D
1;199        CPI  80H
1;200        JP   N1
1;201        CPI  30
1;202        JM   N1
1;203        CPI  32
1;204        JNZ  N2
1;205        MVI  A,0
1;206 N8     CALL MPY
1;207        PUSH H
1;208        LXI  H,LN3
1;209        CALL ACTIV
1;210        DCX  D
1;211        STAX D
1;212        INX  D
1;213        STAX D
1;214        POP  H
1;215        JMP  N9
1;216 N2     CPI  31
1;217        JNZ  N3
1;218        MVI  A,15
1;219        JMP  N8
1;220 N3     MVI  A,10
1;221        JMP  N8
1;222 N1     INX  D
1;223 N9     INX  D
1;224        INR  C
1;225        DCR  B
1;226        JNZ  L3LOP
1;227 *
1;228 LINE4  LHLD NONUM
1;229        XCHG
1;230        MVI  C,1
1;231        MVI  B,24
1;232 L4LOP  LDAX D
1;233        CPI  80H
1;234        JP   01
1;235        CPI  26
1;236        JM   01
1;237        CPI  29
1;238        JNZ  02
1;239        MVI  A,5
1;240 08     CALL MPY
1;241        PUSH H
1;242        LXI  H,LN4
1;243        CALL ACTIV
1;244        DCX  D
1;245        STAX D
```

```
1,246        INX  D
1;247        STAX D
1;248        POP  H
1;249        JMP  09
1;250 02     CPI  28
2;001        JNZ  03
2;002        MVI  A,0
2;003        JMP  08
2;004 03     CPI  27
2;005        JNZ  04
2;006        MVI  A,15
2;007        JMP  08
2;008 04     MVI  A,10
2;009        JMP  08
2;010 01     INX  D
2;011 09     INX  D
2;012        INR  C
2;013        DCR  B
2;014        JNZ  L4LOP
2;015 *
2;016 LINE5  LHLD NONUM
2;017        XCHG
2;018        MVI  C,1
2;019        MVI  B,24
2;020 L5LOP  LDAX D
2;021        CPI  80H
2;022        JP   P1
2;023        CPI  23
2;024        JM   P1
2;025        CPI  25
2;026        JNZ  P2
2;027        MVI  A,0
2;028 P8     CALL MPY
2;029        PUSH H
2;030        LXI  H,LN5
2;031        CALL ACTIV
2;032        DCX  D
2;033        STAX D
2;034        INX  D
2;035        STAX D
2;036        POP  H
2;037        JMP  P9
2;038 P2     CPI  24
2;039        JNZ  P3
2;040        MVI  A,15
2;041        JMP  P8
2;042 P3     MVI  A,10
2;043        JMP  P8
2;044 P1     INX  D
2;045 P9     INX  D
2;046        INR  C
2;047        DCR  B
2;048        JNZ  L5LOP
2;049        LXI  D,LN5
2;050 *
2;051 LINE6  LHLD NONUM
2;052        XCHG
2;053        MVI  C,1
```

```
2,054        MVI   B,24
2;055 L6LOP  LDAX  D
2;056        CPI   80H
2;057        JP    Q1
2;058        CPI   20
2;059        JM    Q1
2;060        CPI   22
2;061        JNZ   Q2
2;062        MVI   A,5
2;063 Q8     CALL  MPY
2;064        PUSH  H
2;065        LXI   H,LN6
2;066        CALL  ACTIV
2;067        DCX   D
2;068        STAX  D
2;069        INX   D
2;070        STAX  D
2;071        POP   H
2;072        JMP   Q9
2;073 Q2     CPI   21
2;074        JNZ   Q3
2;075        MVI   A,0
2;076        JMP   Q8
2;077 Q3     MVI   A,10
2;078        JMP   Q8
2;079 Q1     INX   D
2;080 Q9     INX   D
2;081        INR   C
2;082        DCR   B
2;083        JNZ   L6LOP
2;084 *
2;085 LINE7  LHLD  NONUM
2;086        XCHG
2;087        MVI   C,1
2;088        MVI   B,24
2;089 L7LOP  LDAX  D
2;090        CPI   80H
2;091        JP    R1
2;092        CPI   18
2;093        JM    R1
2;094        CPI   19
2;095        JNZ   R2
2;096        MVI   A,25
2;097 R8     CALL  MPY
2;098        PUSH  H
2;099        LXI   H,LN7
2;100        CALL  ACTIV
2;101        DCX   D
2;102        STAX  D
2;103        INX   D
2;104        STAX  D
2;105        POP   H
2;106        JMP   R9
2;107 R2     MVI   A,20
2;108        JMP   R8
2;109 R1     INX   D
2;110 R9     INX   D
2;111        INR   C
2;112        DCR   B
2;113        JNZ   L7LOP
2;114 *
2;115 LINE8  LHLD  NONUM
2;116        XCHG
2;117        MVI   C,1
2;118        MVI   B,24
2;119 L8LOP  LDAX  D
2;120        CPI   80H
2;121        JP    S1
2;122        CPI   14
2;123        JM    S1
2;124        CPI   17
2;125        JNZ   S2
2;126        MVI   A,35
2;127 S8     CALL  MPY
2;128        PUSH  H
2;129        LXI   H,LN8
2;130        CALL  ACTIV
2;131        DCX   D
2;132        STAX  D
2;133        INX   D
2;134        STAX  D
2;135        POP   H
2;136        JMP   S9
2;137 S2     CPI   16
2;138        JNZ   S3
2;139        MVI   A,30
2;140        JMP   S8
2;141 S3     CPI   15
2;142        JNZ   S4
2;143        MVI   A,25
2;144        JMP   S8
2;145 S4     MVI   A,20
2;146        JMP   S8
2;147 S1     INX   D
2;148 S9     INX   D
2;149        INR   C
2;150        DCR   B
2;151        JNZ   L8LOP
2;152 *
2;153 LINE9  LHLD  NONUM
2;154        XCHG
2;155        MVI   C,1
2;156        MVI   B,24
2;157 L9LOP  LDAX  D
2;158        CPI   80H
2;159        JP    T1
2;160        CPI   11
2;161        JM    T1
2;162        CPI   13
2;163        JNZ   T2
2;164        MVI   A,30
2;165 T8     CALL  MPY
2;166        PUSH  H
2;167        LXI   H,LN9
2;168        CALL  ACTIV
2;169        DCX   D
2;170        STAX  D
```

```
2;171          INX   D
2;172          STAX  D
2;173          POP   H
2;174          JMP   T9
2;175 T2       CPI   12
2;176          JNZ   T3
2;177          MVI   A,25
2;178          JMP   T8
2;179 T3       MVI   A,20
2;180          JMP   T8
2;181 T1       INX   D
2;182 T9       INX   D
2;183          INR   C
2;184          DCR   B
2;185          JNZ   L9LOP

2;186 *
2;187 LIN10    LHLD  NONUM
2;188          XCHG
2;189          MVI   C,1
2;190          MVI   B,24
2;191 L10LP    LDAX  D
2;192          CPI   80H
2;193          JP    U1
2;194          CPI   8
2;195          JM    U1
2;196          CPI   10
2;197          JNZ   U2
2;198          MVI   A,35
2;199 U8       CALL  MPY
2;200          PUSH  H

2;201          LXI   H,LN10
2;202          CALL  ACTIV
2;203          DCX   D
2;204          STAX  D
2;205          INX   D
2;206          STAX  D
2;207          POP   H
2;208          JMP   U9
2;209 U2       CPI   9
2;210          JNZ   U3
2;211          MVI   A,30
2;212          JMP   U8
2;213 U3       MVI   A,20
2;214          JMP   U8
2;215 U1       INX   D

2;216 U9       INX   D
2;217          INR   C
2;218          DCR   B
2;219          JNZ   L10LP
2;220 *
2;221 LIN11    LHLD  NONUM
2;222          XCHG
2;223          MVI   C,1
2;224          MVI   B,24
2;225 L11LP    LDAX  D
2;226          CPI   80H
2;227          JP    V1
2;228          CPI   4
2;229          JM    V1
2,230          CPI   7

2;231          JNZ   V2
2;232          MVI   A,35
2;233 V8       CALL  MPY
2;234          PUSH  H
2;235          LXI   H,LN11
2;236          CALL  ACTIV
2;237          DCX   D
2;238          STAX  D
2;239          INX   D
2;240          STAX  D
2;241          POP   H
2;242          JMP   V9
2;243 V2       CPI   6
2;244          JNZ   V3
2;245          MVI   A,30

2;246          JMP   V8
2;247 V3       CPI   5
2;248          JNZ   V4
2;249          MVI   A,25
2;250          JMP   V8
3;001 V4       MVI   A,20
3;002          JMP   V8
3;003 V1       INX   D
3;004 V9       INX   D
3;005          INR   C
3;006          DCR   B
3;007          JNZ   L11LP
3;008 *
3;009 LIN12    LHLD  NONUM
3;010          XCHG

3;011          MVI   C,1
3;012          MVI   B,24
3;013 L12LP    LDAX  D
3;014          CPI   80H
3;015          JP    W1
3;016          CPI   3
3;017          JNZ   W2
3;018          MVI   A,35
3;019 W8       CALL  MPY
3;020          PUSH  H
3;021          LXI   H,LN12
3;022          CALL  ACTIV
3;023          DCX   D
3;024          STAX  D
3;025          INX   D

3;026          STAX  D
3;027          POP   H
3;028          JMP   W9
3;029 W2       CPI   2
3;030          JNZ   W3
3;031          MVI   A,30
3;032          JMP   W8
3;033 W3       MVI   A,20
3;034          JMP   W8
3;035 W1       INX   D
3;036 W9       INX   D
3;037          INR   C
```

```
3,038        DCR  B
3;039        JNZ  L12LP
3;040 *
3;041 * BEGIN ASSIGNING ACTIVE
3;042 * CELLS TO THE STAFF
3;043 *
3;044        LXI  H,STAF3+3
3;045        SHLD STF3
3;046        LXI  H,STAF2+3
3;047        SHLD STF2
3;048        LXI  D,STAF1+3
3;049        XCHG
3;050        SHLD STF1
3;051        XCHG
3;052        LXI  B,LN1
3;053        CALL MOVE1
3;054 *
3;055        LXI  H,STAF4+3
3;056        SHLD STF3
3;057        LXI  H,STAF3+3
3;058        SHLD STF2
3;059        LXI  D,STAF2+3
3;060        XCHG
3;061        SHLD STF1
3;062        XCHG
3;063        LXI  B,LN2
3;064        CALL MOVE1
3;065 *
3;066        LXI  H,STAF5+3
3;067        SHLD STF3
3;068        LXI  H,STAF4+3
3;069        SHLD STF2
3;070        LXI  D,STAF3+3
3;071        XCHG
3;072        SHLD STF1
3;073        XCHG
3;074        LXI  B,LN3
3;075        CALL MOVE1
3;076 *
3;077        LXI  H,STAF6+3
3;078        SHLD STF3
3;079        LXI  H,STAF5+3
3;080        SHLD STF2
3;081        LXI  D,STAF4+3
3;082        XCHG
3;083        SHLD STF1
3;084        XCHG
3;085        LXI  B,LN4
3;086        CALL MOVE1
3;087 *
3;088        LXI  H,STAF7+3
3;089        SHLD STF3
3;090        LXI  H,STAF6+3
3;091        SHLD STF2
3;092        LXI  D,STAF5+3
3;093        XCHG
3;094        SHLD STF1
3;095        XCHG
3,096        LXI  B,LN5
3;097        CALL MOVE1
3;098 *
3;099        LXI  H,STAF8+3
3;100        SHLD STF3
3;101        LXI  H,STAF7+3
3;102        SHLD STF2
3;103        LXI  D,STAF6+3
3;104        XCHG
3;105        SHLD STF1
3;106        XCHG
3;107        LXI  B,LN6
3;108        CALL MOVE1
3;109 *
3;110        LXI  H,STAF7+3
3;111        SHLD STF3
3;112        LXI  H,STAF6+3
3;113        SHLD STF2
3;114        LXI  D,STAF5+3
3;115        XCHG
3;116        SHLD STF1
3;117        XCHG
3;118        LXI  B,LN7
3;119        CALL MOVE1
3;120 *
3;121        LXI  H,STAF8+3
3;122        SHLD STF3
3;123        LXI  H,STAF7+3
3;124        SHLD STF2
3;125        LXI  D,STAF6+3
3;126        XCHG
3;127        SHLD STF1
3;128        XCHG
3;129        LXI  B,LN8
3;130        CALL MOVE1
3;131 *
3;132        LXI  H,STAF9+3
3;133        SHLD STF3
3;134        LXI  H,STAF8+3
3;135        SHLD STF2
3;136        LXI  D,STAF7+3
3;137        XCHG
3;138        SHLD STF1
3;139        XCHG
3;140        LXI  B,LN9
3;141        CALL MOVE1
3;142 *
3;143        LXI  H,STF10+3
3;144        SHLD STF3
3;145        LXI  H,STAF9+3
3;146        SHLD STF2
3;147        LXI  D,STAF8+3
3;148        XCHG
3;149        SHLD STF1
3;150        XCHG
3;151        LXI  B,LN10
3;152        CALL MOVE1
3;153 *
```

```
        LXI  H,STF11+3
        SHLD STF3
        LXI  H,STF10+3
        SHLD STF2
        LXI  D,STAF9+3
        XCHG
        SHLD STF1

        XCHG
        LXI  B,LN11
        CALL MOVE1
*
        LXI  H,STF12+3
        SHLD STF3
        LXI  H,STF11+3
        SHLD STF2
        LXI  D,STF10+3
        XCHG
        SHLD STF1
        XCHG
        LXI  B,LN12
        CALL MOVE1
*

* NOW THE ACTUAL PRINTING OF A STAFF
*
        LXI  D,STAF1
        MVI  B,12
FLOP1   MVI  C,81
FLOP2   LDAX D
        CALL PRINT
        INX  D
        DCR  C
        JNZ  FLOP2
        MVI  A,0DH
        CALL PRINT
        DCR  B
        JNZ  FLOP1
*

* EXIT BACK TO OS IF DONE
*
        LXI  B,48
        LHLD NONUM
        DAD  B
        SHLD NONUM
        XCHG
        LHLD ENDAD
        MOV  A,H
        CMP  D
        JNZ  NWSTF
        MOV  A,L
        CMP  E
        JP   NWSTF
        CALL PRCR8

        LHLD REENT
        PCHL
*
* BUFFER  OUTPUT TO TERMINAL
*
TNOUA   LDAX D
```

```
3;212         CALL OUTT
3;213         INX  D
3;214         DCR  B
3;215         JNZ  TNOUA
3;216         RET
3;217 CRLF    MVI  A,0DH
3;218 OUTT    PUSH M
3;219 OU1     IN   16
3;220         ANI  2

3;221         JZ   OU1
3;222         POP  M
3;223         OUT  17
3;224         CPI  0DH
3;225         RNZ
3;226         MVI  A,0AH
3;227         JMP  OUTT
3;228 TIN     IN   16
3;229         ANI  1
3;230         JZ   TIN
3;231         IN   17
3;232         PUSH M
3;233         CALL OUTT
3;234         POP  M
3;235         ANI  7FH

3;236         RET
3;237 *
3;238 * FOUR DIGIT HEX INPUT
3;239 *
3;240 HEXIN LXI  H,0
3;241         MVI  C,4
3;242 HXLOP DAD  H
3;243         DAD  H
3;244         DAD  H
3;245         DAD  H
3;246         CALL TIN
3;247 PROCH SBI  30H
3;248         CPI  0AH
3;249         JM   HXOK
3;250         SBI  07H

4;001 HXOK    ADD  L
4;002         MOV  L,A
4;003         DCR  C
4;004         JNZ  HXLOP
4;005         RET
4;006 *
4;007 * PRINT 4 CR/LF'S
4;008 *
4;009 PRCR8 MVI  A,0DH
4;010         MVI  B,4
4;011 PRCRL CALL PRINT
4;012         DCR  B
4;013         JNZ  PRCRL
4;014         RET
4;015 *

4;016 * ACTIVATE CELL AND FLAG IT
4;017 *
4;018 ACTIV PUSH B
4;019         MVI  B,0
4;020         DAD  B
4;021         MOV  B,H
4;022         MOV  C,L
4;023         STAX B
4;024         POP  B
4;025         RET
4;026 *
4;027 *
4;028 * MPY DETERMINES WHICH
4;029 * CELL TO USE
4;030 *

4;031 MPY     MOV  L,A
4;032         INX  D
4;033         LDAX D
4;034         ADD  L
4;035         ORI  80H
4;036         RET
4;037 *
4;038 * HEX OUTPUT TO TERMINAL
4;039 *
4;040 HXOUT PUSH M
4;041         RRC
4;042         RRC
4;043         RRC
4;044         RRC
4;045         CALL HOUT

4;046         POP  M
4;047 HOUT    ANI  0FH
4;048         ADI  30H
4;049         CPI  3AH
4;050         JM   HGO
4;051         ADI  7
4;052 HGO     CALL OUTT
4;053         LDA  HXTMP
4;054         RET
4;055 *
4;056 * MOVE1 SCANS LOCAL LINE
4;057 * FOR ACTIVE CELLS
4;058 *
4;059 MOVE1 MVI  H,3
4;060         MVI  L,25

4;061 MVLOP LDAX B
4;062         ANI  7FH
4;063         CPI  41
4;064         CM   MOVE
4;065 SKIP    INX  B
4;066         INR  H
4;067         INR  H
4;068         INR  H
4;069         DCR  L
4;070         JNZ  MVLOP
4;071         RET
4;072 *
4;073 * MOVE ACTUALLY PLACES
4;074 * ACTIVE CELLS INTO
4;075 * STAFF IMAGE FOR PRINTING

4;076 *
4;077 MOVE    PUSH B
```

```
        PUSH D
        PUSH H
        MVI  B,0
        LXI  H,0
        MOV  C,A
        MOV  L,A
        DAD  H
        DAD  H
        DAD  H
        DAD  B
        LXI  B,CELLS
        DAD  B
        MOV  B,H

        MOV  C,L
        LXI  D,0
        POP  H
        PUSH H
        MOV  E,H
        LHLD STF1
        DAD  D
        XCHG
        MVI  L,3
ML1     LDAX B
        STAX D
        INX  B
        INX  D
        DCR  L
        JNZ  ML1

        LXI  D,0
        POP  H
        PUSH H
        MOV  E,H
        LHLD  STF2
        DAD  D
        XCHG
        MVI  L,3
ML2     LDAX B
        STAX D
        INX  B
        INX  D
        DCR  L
        JNZ  ML2
        LXI  D,0

        POP  H
        PUSH H
        MOV  E,H
        LHLD STF3
        DAD  D
        XCHG
        MVI  L,3
ML3     LDAX B
        STAX D
        INX  B
        INX  D
        DCR  L
        JNZ  ML3
        POP  H
        POP  D
        POP  B
        RET
*
* ACTUAL PRINT ROUTINE
*
PRINT   PUSH H
        PUSH D
        PUSH B
        PUSH M
        ANI  7FH
        CPI  0AH
        JZ   LF
        CPI  0DH
        JZ   LINE
        ADI  80H

        JC   EXIT
        SUI  0A0H
        JC   EXIT
OK      LHLD TXPTR
        MOV  M,A
        INX  H
        CALL HH
        LXI  D,ENDBF
        MOV  A,H
        CMP  D
        JNZ  EXIT
        MOV  A,L
        CMP  E
        JZ   LINE
EXIT    POP  M

        POP  B
        POP  D
        POP  H
        RET
*
*
LINE    CALL HOME
        MVI  A,0FEH
        CALL MOTOR
LINLP   CALL CNTIN
        IN   PTR1
        ANI  4
        JZ   LINLP
        CALL PRNTR
        CALL NWBFR

LF      MVI  A,0FBH
        CALL MOTOR
        LHLD SOLON
        CALL MRKTM
        LHLD SOLOF
        CALL WASTE
        JMP  EXIT
*
*
PRNTR   LXI  H,LNBFR
        SHLD IXREG
TXFCH   MOV  L,M
        SUB  A
        MOV  H,A
```

```
4;195        MOV   A,L
4;196        ANI   80H
4;197        JNZ   HOME
4;198        MOV   D,H
4;199        MOV   E,L
4;200        DAD   H
4;201        DAD   H
4;202        DAD   D
4;203        LXI   D,FNTBL
4;204        DAD   D
4;205        MVI   B,5
4;206 FNFCH  MOV   C,M
4;207        PUSH  H
4;208        CALL  FNTOT
4;209        POP   H
4;210        INX   H
4;211        DCR   B
4;212        JNZ   FNFCH
4;213        LHLD  INCHR
4;214        CALL  MRKTM
4;215 NXCHR  LHLD  IXREG
4;216        INX   H
4;217        SHLD  IXREG
4;218        JMP   TXFCH
4;219 FNTOT  CALL  CNTIN
4;220        MOV   A,C
4;221        CMA
4;222        ANI   7FH
4;223        OUT   PTR1
4;224        LHLD  HAMON
4;225        CALL  WASTE
4;226        LHLD  HAMOF
4;227 MRKTM  MOV   A,L
4;228        ORA   H
4;229        RZ
4;230        CALL  CNTIN
4;231        DCX   H
4;232        JMP   MRKTM
4;233 WASTE  DCX   H
4;234        MOV   A,L
4;235        ORA   H
4;236        JNZ   WASTE
4;237        RET
4;238 HOME   IN    PTR1
4;239        ANI   4
4;240        RZ
4;241        MVI   A,OFDH
4;242        CALL  MOTOR
4;243 HOMLP  CALL  CNTIN
4;244        IN    PTR1
4;245        ANI   4
4;246        JNZ   HOMLP
4;247        LHLD  OVRUN
4;248        CALL  MRKTM
4;249        MVI   A,OFFH
4;250 MOTOR  STA   PTCMD
5;001 ASYNC  IN    PTR1
5;002        ANI   1
5;003        MOV   L,A
5;004 ACLOP  IN    PTR1
5;005        ANI   1
5;006        XRA   L
5;007        JZ    ACLOP
5;008 CNTIN  MVI   A,7FH
5;009        OUT   PTR1
5;010        LDA   PTCMD
5;011        OUT   PTR1
5;012        RET
5;013 NWBFR  LXI   H,LNBFR
5;014 HH     MVI   M,OFFH
5;015        SHLD  TXPTR
5;016        RET
5;017 *
5;018 * NOTE PATTERN FONTS
5;019 *
5;020 FNTBL  DW    3D0FH
5;021        DW    1D5DH
5;022        DB    8DH
5;023        DW    0101H     TC1
5;024        DW    097FH
5;025        DB    81H
5;026        DW    6141H     TC2
5;027        DW    0101H
5;028        DB    81H
5;029        DW    2103H     TC3
5;030        DW    117FH
5;031        DB    89H
5;032        DW    0105H     TC4
5;033        DW    0101H
5;034        DB    81H
5;035        DW    1143H     TC5
5;036        DW    0509H
5;037        DB    0E3H
5;038        DW    6911H     TC6
5;039        DW    017FH
5;040        DB    81H
5;041        DW    0501H     TC7
5;042        DW    1109H
5;043        DB    0E3H
5;044        DW    0501H     TC8
5;045        DW    1109H
5;046        DB    41H
5;047        DW    0721H     TC9
5;048        DW    037FH
5;049        DB    0A1H
5;050        DW    1141H     TC10
5;051        DW    0509H
5;052        DB    81H
5;053        DW    0
5;054        DW    0
5;055        DB    80H
5;056        DW    7D49H     STF SP #
5;057        DW    7D49H
5;058        DB    49H
5;059        DW    0
5;060        DW    0
5;061        DB    0
```

```
5;062    DW   0301H   TP STF LN/FR #
5;063    DW   0301H
5;064    DB   81H
5;065    DW   1D09H   BT STF LN #
5;066    DW   1D09H
5;067    DB   89H
5;068    DW   0
5;069    DW   0
5;070    DB   0
5;071    DW   0678H   OPN FR BDY
5;072    DW   0606H
5;073    DB   0F8H
5;074    DW   4123H   TP OPN FR BDY
5;075    DW   4141H
5;076    DB   0A3H
5;077    DW   100CH   BT OPN FR BDY
5;078    DW   1010H
5;079    DB   8CH
5;080    DW   7E78H   SLD FR BDY
5;081    DW   7E7EH
5;082    DB   0F8H
5;083    DW   6323H   TP SLD FR BDY
5;084    DW   6363H
5;085    DB   0C5H
5;086    DW   1C0CH   BT SLD FR BDY
5;087    DW   1C1CH
5;088    DB   9CH
5;089    DW   1D1CH   WHL REST
5;090    DW   1D1DH
5;091    DB   9DH
5;092    DW   6363H   HLF REST
5;093    DW   6363H
5;094    DB   0E3H
5;095    DW   0
5;096    DW   0
5;097    DB   0
5;098    DW   0
5;099    DW   0
5;100    DB   0
5;101    DW   0
5;102    DW   0
5;103    DB   0
5;104    DW   7C40H   FR SP #
5;105    DW   7C40H
5;106    DB   0FCH
5;107    DW   0
5;108    DW   0
5;109    DB   0
5;110    DW   1C00H   BT FR SP #
5;111    DW   1C00H
5;112    DB   88H
5;113    DW   0
5;114    DW   0
5;115    DB   0
5;116    DW   0779H   OPN STF BDY
5;117    DW   0707H
5;118    DB   0F9H
5;119    DW   4123H   TP OPN STF BDY
```

```
5;120   DW   4141H
5;121   DB   0A3H
5;122   DW   110DH   BT OPN STF BDY
5;123   DW   1111H
5;124   DB   8DH
5;125   DW   7F79H   SLD STF BDY

5;126   DW   7F7FH
5;127   DB   0F9H
5;128   DW   6323H   TP SLD STF BDY
5;129   DW   6363H
5;130   DB   0A3H
5;131   DW   1D0DH   BT SLD STF BDY
5;132   DW   1D1DH
5;133   DB   8DH
5;134   DW   017FH   L STEM W/B
5;135   DW   0101H
5;136   DB   80H
5;137   DW   015DH   L UP STUB W/B
5;138   DW   0101H
5;139   DB   81H
5;140   DW   057FH   L STEM W/B+ETH

5;141   DW   1109H
5;142   DB   81H
5;143   DW   0
5;144   DW   0
5;145   DB   0
5;146   DW   007FH   L STEM
5;147   DW   0000H
5;148   DB   80H
5;149   DW   005CH   L UP STEM
5;150   DW   0000H
5;151   DB   80H
5;152   DW   087FH   L STEM W/ETH
5;153   DW   4010H
5;154   DB   80H
5;155   DW   0000H   R STEM

5;156   DW   0
5;157   DB   0FFH
5;158   DW   0
5;159   DW   0
5;160   DB   0
5;161   DW   0101H   R STEM W/B
5;162   DW   0101H
5;163   DB   0FFH
5;164   DW   0101H   R DN STUB W/B
5;165   DW   0101H
5;166   DB   0E3H
5;167   DW   2103H   R ETH W/B
5;168   DW   0141H
5;169   DB   81H
5;170   DW   0000H   R DN STUB

5;171   DW   0000H
5;172   DB   0E3H
5;173   DW   0901H   ETH REST
5;174   DW   0909H
5;175   DB   0FDH
5;176   DW   0901H   SIXT REST
5;177   DW   4949H
```

```
5,178        DB    OFBM
5;179        DW    0701H    TP Q REST
5;180        DW    712BH
5;181        DB    81H
5;182        DW    2301H    BT Q REST
5;183        DW    5945H
5;184        DB    0A1H
5;185        DW    0

5;186        DW    0
5;187        DB    0
5;188        DW    0101H    LINE
5;189        DW    0101H
5;190        DB    81H
5;191        DW    0
5;192        DW    0
5;193        DB    80H
5;194  SOLON DW    0190H
5;195  SOLOF DW    10D2H
5;196  OVRUN DW    01C0H
5;197  INCHR DW    0008H
5;198  HAMON DW    0030H
5;199  HAMOF DW    0011H
5;200  IXREG DW    0000

5;201  PTCMD DB    00
5;202  LNBFR DB    0FFH
5;203        DS    5EH
5;204  TXPTR DW    LNBFR
5;205  ENDBF DB    00
5;206  PTR1  EQU   0
5;207  LN1   DS    26
5;208  LN2   DS    26
5;209  LN3   DS    26
5;210  LN4   DS    26
5;211  LN5   DS    26
5;212  LN6   DS    26
5;213  LN7   DS    26
5;214  LN8   DS    26
5;215  LN9   DS    26

5;216  LN10  DS    26
5;217  LN11  DS    26
5;218  LN12  DS    26
5;219  *
5;220  * THIS IS THE STAFF
5;221  *
5;222  STAF1 DS    81
5;223  STAF2 DS    81
5;224  STAF3 DS    81
5;225  STAF4 DS    81
5;226  STAF5 DS    81
5;227  STAF6 DS    81
5;228  STAF7 DS    81
5;229  STAF8 DS    81
5;230  STAF9 DS    81

5;231  STF10 DS    81
5;232  STF11 DS    81
5;233  STF12 DS    81
5;234  STF1  DW    0000
5;235  STF2  DW    0000
```

```
5,236  STF3  DW    0000
5;237  NONUM DW    0000
5;238  ENDAD DW    0000
5;239  OTMP  DB    0
5;240  INTMP DB    0
5;241  HXTMP DB    0
5;242  SAMSG DW    'TS'
5;243        DW    'RA'
5;244        DW    'IT'
5;245        DW    'GN'

5;246        DW    'A '
5;247        DW    'DD'
5;248        DW    'ER'
5;249        DW    'SS'
5;250        DW    'O '
6;001        DW    ' F'
6;002        DW    'ON'
6;003        DW    'ET'
6;004        DW    'D '
6;005        DW    'TA'
6;006        DW    ':A'
6;007        DB    ' '
6;008  EAMSG DW    'NE'
6;009        DW    'ID'
6;010        DW    'GN'

6;011        DW    'A '
6;012        DW    'DD'
6;013        DW    'ER'
6;014        DW    'SS'
6;015        DW    'O '
6;016        DW    ' F'
6;017        DW    'ON'
6;018        DW    'ET'
6;019        DW    'D '
6;020        DW    'TA'
6;021        DW    ':A'
6;022        DB    ' '
6;023  CELLS DW    'XX'
6;024        DB    '@'
6;025        DW    'XX'

6;026        DW    'XX'
6;027        DW    'XX'
6;028        DB    'X'
6;029        DB    'P'
6;030        DB    '@'
6;031        DB    'X'
6;032        DB    'O'
6;033        DB    'X'
6;034        DB    'X'
6;035        DB    'O'
6;036        DB    'X'
6;037        DB    'X'
6;038        DB    'P'
6;039        DB    'C'
6;040        DB    'X'

6;041        DB    'O'
6;042        DB    'X'
6;043        DB    'X'
```

```
6,044         DB   'O'
6;045         DB   'X'
6;046         DB   'X'
6;047         DB   'P'
6;048         DB   'C'
6;049         DB   'X'
6;050         DB   'O'
6;051         DB   'X'
6;052         DB   'X'
6;053         DB   'O'
6;054         DB   'Q'
6;055         DB   'X'

6;056         DB   'P'
6;057         DB   'C'
6;058         DB   'X'
6;059         DB   'O'
6;060         DB   'Q'
6;061         DB   'X'
6;062         DB   'O'
6;063         DB   'Q'
6;064 *
6;065 * END BLOCK 1
6;066 *
6;067         DB   'X'
6;068         DB   ','
6;069         DB   '@'
6;070         DW   'XX'

6;071         DW   'XX'
6;072         DW   'XX'
6;073         DW   'P,'
6;074         DW   'X@'
6;075         DW   'XO'
6;076         DW   'OX'
6;077         DB   'X'
6;078         DW   'P,'
6;079         DW   'XC'
6;080         DW   'XO'
6;081         DW   'OX'
6;082         DB   'X'
6;083         DW   'P,'
6;084         DW   'XC'
6;085         DW   'XO'

6;086         DW   'OX'
6;087         DB   'Q'
6;088         DW   'P,'
6;089         DW   'XC'
6;090         DW   'QO'
6;091         DW   'OX'
6;092         DB   'Q'
6;093 *
6;094 * END BLOCK 2
6;095 *
6;096         DW   'XX'
6;097         DW   'XA'
6;098         DW   'BX'
6;099         DW   'XX'
6;100         DB   'X'

6;101         DW   'XX'
```

```
6,102         DW   'XA'
6;103         DW   'BO'
6;104         DW   'OX'
6;105         DB   'X'
6;106         DW   'XX'
6;107         DW   'XD'
6;108         DW   'EO'
6;109         DW   'OX'
6;110         DB   'X'
6;111         DW   'XX'
6;112         DW   'XD'
6;113         DW   'EO'
6;114         DW   'OX'
6;115         DB   'Q'

6;116         DW   'XX'
6;117         DW   'XD'
6;118         DW   ' O'
6;119         DW   'OX'
6;120         DB   'Q'
6;121 *
6;122 * END BLOCK 3
6;123 *
6;124         DW   '.X'
6;125         DW   'XA'
6;126         DW   'B/'
6;127         DW   'XX'
6;128         DB   'X'
6;129         DW   'X.'
6;130         DW   '/A'

6;131         DW   'BQ'
6;132         DW   'QX'
6;133         DB   'X'
6;134         DW   'X.'
6;135         DW   '/D'
6;136         DW   'EO'
6;137         DW   'OX'
6;138         DB   'X'
6;139         DW   'X.'
6;140         DW   '/D'
6;141         DW   'EO'
6;142         DW   'OX'
6;143         DB   'Q'
6;144         DW   'X.'
6;145         DW   '/D'

6;146         DW   ' O'
6;147         DW   'OX'
6;148         DB   'Q'
6;149 *
6;150 * END BLOCK 4
6;151 *
6;152         DW   'XX'
6;153         DW   'XX'
6;154         DW   'XX'
6;155         DW   '@X'
6;156         DB   'X'
6;157         DW   'XX'
6;158         DW   'XF'
6;159         DW   'FX'
6;160         DW   '@X'
```

```
6;161         DB    'G'
6;162         DW    'XX'
6;163         DW    'XF'
6;164         DW    'FX'
6;165         DW    'CX'
6;166         DB    'G'
6;167         DW    'XX'
6;168         DW    'XH'
6;169         DW    'FX'
6;170         DW    'CX'
6;171         DB    'G'
6;172         DW    'XX'
6;173         DW    'XH'
6;174         DW    'HX'
6;175         DW    'CX'

6;176         DB    'G'
6;177  *
6;178  * END BLOCK 5
6;179  *
6;180         DW    'XX'
6;181         DW    'XX'
6;182         DW    'XX'
6;183         DW    '@,'
6;184         DB    'X'
6;185         DW    'XX'
6;186         DW    'XF'
6;187         DW    'FX'
6;188         DW    '@,'
6;189         DB    'G'
6;190         DW    'XX'

6;191         DW    'XF'
6;192         DW    'FX'
6;193         DW    'C,'
6;194         DB    'G'
6;195         DW    'XX'
6;196         DW    'XL'
6;197         DW    'FX'
6;198         DW    'C,'
6;199         DB    'G'
6;200         DW    'XX'
6;201         DW    'XH'
6;202         DW    'HX'
6;203         DW    'C,'
6;204         DB    'G'
6;205  *

6;206  * END BLOCK 6
6;207  *
6;208         DW    'XX'
6;209         DW    'XX'
6;210         DW    'XA'
6;211         DW    'BX'
6;212         DB    'X'
6;213         DW    'XX'
6;214         DW    'XF'
6;215         DW    'FA'
6;216         DW    'BX'
6;217         DB    'X'
6;218         DW    'XX'
6;219         DW    'XF'
6;220         DW    'FD'

6;221         DW    'EX'
6;222         DB    'X'
6;223         DW    'XX'
6;224         DW    'XH'
6;225         DW    'FD'
6;226         DW    'EX'
6;227         DB    'X'
6;228         DW    'XX'
6;229         DW    'XH'
6;230         DW    'HD'
6;231         DW    'EX'
6;232         DB    'X'
6;233  *
6;234  * END BLOCK 7
6;235  *

6;236         DW    'XX'
6;237         DW    '.X'
6;238         DW    'XA'
6;239         DW    'B/'
6;240         DB    'X'
6;241         DW    'XX'
6;242         DW    '.F'
6;243         DW    'FA'
6;244         DW    'B/'
6;245         DB    'X'
6;246         DW    'XX'
6;247         DW    '.F'
6;248         DW    'FD'
6;249         DW    'E/'
6;250         DB    'X'

7;001         DW    'XX'
7;002         DW    '.H'
7;003         DW    'FD'
7;004         DW    'E/'
7;005         DB    'X'
7;006         DW    'XX'
7;007         DW    '.H'
7;008         DW    'HD'
7;009         DW    'E/'
7;010         DB    'X'
7;011  *
7;012  * END BLOCK 8
7;013  *
7;014         DW    'XX'
7;015         DW    'XX'

7;016         DW    'XX'
7;017         DW    'XX'
7;018         DB    'X'
7;019         DW    'YY'
7;020         DW    'YY'
7;021         DW    'YY'
7;022         DW    'YY'
7;023         DB    'Y'
7;024  *
7;025  * ABOVE 10 LINES
7;026  * ARE BLANKS AND
7;027  * OPEN STAVES
```

```
7;028 *
7;029 CELL  EQU  CELLS
7;030 REENT DW   0000


7;031       END


EDIT--
$TRAC   2600  7FA8  80A9


                DRIVE 1  TEND=27EB
NAME    BYTES  TLOC       NAME    BYTES  TLOC
$TRAC   59A9   0546       TRACE   0FB4   0CFD
$TIME   0BCB   0E9C       TIMER   0144   0FEA
$NOTE   323F   106C       NOTE    0625   1480
$MUFR   2FFE   1559       MUFRT   055D   190E
$MUSE   4011   19D3       MUSED   081C   1E6C
$PRIN   1F95   1F59       PRINT   042A   21BB
ASMBL   1200   2266       MEDIT   05EB   23E6
HIBUG   0377   24AA       PDUMO   1DF4   2548
DUMRO   0436   2787
OK--LO $MUSE

1,003 * NOTE DATA EDIT ROUTINE *
1;004 *                        *
1;005 **************************
1;006 *
1;007 * ASSEMBLE TO EXECUTE AT B000 (HEX) VIA
1;008 * OK--ASSM B000 B000 3000
1;009 *
1;010 *
1;011 *
1;012 *
1;013 *
1;014 * 12/04/78----VER. 4.0
1;015 *


1;016 *
1;017       JMP  START
1;018 TIN   JMP  TIN
1;019 OUTT  JMP  OUTT
1;020 CRLF  JMP  CRLF
1;021 START POP  H
1;022       SHLD REENT
1;023       LXI  D,3
1;024       DAD  D
1;025       SHLD TIN+1
1;026       DAD  D
1;027       SHLD OUTT+1
1;028       DAD  D
1;029       SHLD CRLF+1
1;030 *


1;031 * INITITALIZE SYSTEM AND USER
1;032 *
1;033       LXI  D,GODBF
1;034       CALL TNOUA
1;035       LXI  D,SBUF1
1;036       CALL TNOUA
1;037       CALL HEXIN
```

```
        SHLD FRLOC
        SHLD LRLOC
        SHLD LONOT
        CALL CRLF
        LXI  D,HIABF
        CALL TNOUA
        CALL HEXIN
        SHLD HINOT
*
* MAIN PROGRAM LOOP
*
TMAIN   LXI  D,HEDER
        CALL TNOUA
        LHLD LRLOC
        XCHG
        LDAX D
        CALL TYPER
        CALL TIMER
        LXI  D,SPC4
        CALL TNOUA
        LHLD LRLOC
        CALL HX4OT
        LXI  D,SPC4
        CALL TNOUA
        LHLD FRLOC
        CALL HX4OT
*
* GET THE EDIT VERB...C=CONTINUE PRINTING NOTES
*                     M=MODIFY NOTE
*                     Q=QUIT AND RETURN TO OS
*                     ANYTHING ELSE PRINT EH?
*
GTVRB   LXI  D,GVBBF
        CALL TNOUA
        CALL BUFIN
        LXI  D,IBUFR
        LDAX D
        CPI  'C'
        JZ   CONTI
        CPI  'M'
        JZ   MODIF
        CPI  'Q'
        JZ   QUIT
        LXI  D,EHBUF
        CALL TNOUA
        JMP  GTVRB
*
* CONTINUE PRINTING NOTE ROUTINE
*
CONTI   LHLD FRLOC
        INX  H
        SHLD FRLOC
        SHLD LRLOC
        LHLD SCNED
        INX  H
        SHLD SCNED
        JMP  TMAIN
```

```
*
* QUIT AND RETURN TO OS
*
QUIT    LXI   D,GODBF
        CALL  TNOUA
        LXI   D,ENBF1
        CALL  TNOUA
        LHLD  LONOT
        CALL  HX4OT
        LXI   D,ENBF2
        CALL  TNOUA
        LHLD  SCNED
        CALL  HX4OT
        LXI   D,ENBF3
        CALL  TNOUA
        LHLD  HINOT
        CALL  HX4OT
        LXI   D,ENDF4
        CALL  TNOUA
        LHLD  MODED
        CALL  HX4OT
        LXI   D,ENBF5
        CALL  TNOUA
        CALL  CRLF
        CALL  CRLF
        LHLD  REENT
        PCHL
*
* MODIFY NOTE ROUTINE
*
MODIF   LXI   D,MSGNN
        CALL  TNOUA
        CALL  NOINP
        LHLD  LRLOC
        XCHG
        LHLD  PRLOC
        STAX  D
        JMP   MTES1
MDLOP   STAX  D
        INX   D
MTES1   PUSH  M
        MOV   A,D
        CMP   H
        JZ    NXCK
        POP   M
        JMP   MDLOP
NXCK    MOV   A,E
        CMP   L
        JZ    RETRN
        POP   M
        JMP   MDLOP
RETRN   POP   M
        STAX  D
        PUSH  H
        LHLD  MODED
        INX   H
        SHLD  MODED
        POP   H
        JMP   TMAIN
```

```
*
* OUTPUT 4 HEX DIGITS FROM H,L TO TERMINAL
*
HX4OT MOV  A,H
      CALL HXOUT
      MOV  A,L
      CALL HXOUT
      RET
*
* OUTPUT 2 HEX DIGITS FROM ACCUMULATOR TO TERMINAL
*
HXOUT PUSH M
      RRC
      RRC
      RRC
      RRC
      CALL HOUT
      POP  M
HOUT  ANI  OFH
      ADI  30H
      CPI  3AH
      JM   HOK
      ADI  7
HOK   CALL OUTT
      RET
*
* TERMINAL BUFFER OUTPUT ROUTINE
*
TNOUA PUSH B
      LDAX D
      INX  D
      MOV  B,A
TNLOP LDAX D
      INX  D
      CALL OUTT
      DCR  B
      JNZ  TNLOP
      POP  B
      RET
*
* INPUT 4 HEX DIGITS TO H,L FROM TERMINAL
*
HEXIN MVI  C,4
      LXI  H,0
HXLOP DAD  H
      DAD  H
      DAD  H
      DAD  H
      CALL TIN
      ANI  7FH
      SUI  30H
      CPI  OAH
      JM   HXOK
      SUI  7
HXOK  ADD  L
      MOV  L,A
      DCR  C
      JNZ  HXLOP
```

```
        RET
*
* INPUT ASCII BUFFER FROM TERMINAL TO CORE
*
BUFIN   LXI  D,IBUFR
        MVI  A,' '
        MVI  B,9
BLOP1   STAX D
        INX  D
        DCR  B
        JNZ  BLOP1
        LXI  D,IBUFR
        MVI  B,9
BLOP2   CALL TIN
        ANI  7FH
        CPI  0DH
        RZ
        STAX D
        INX  D
        DCR  B
        JNZ  BLOP2
        LXI  D,EHBUF
        CALL TNOUA
        JMP  BUFIN
*
* INPUT NOTE MODIFICATION AND PHRSE TO DECIMAL REPRESENTATION
*
NOINP   CALL BUFIN
        LXI  D,IBUFR
        LDAX D
        INX  D
        CPI  'A'
        JZ   ANOTE
        CPI  'B'
        JZ   BNOTE
        CPI  'C'
        JZ   CNOTE
        CPI  'D'
        JZ   DNOTE
        CPI  'E'
        JZ   ENOTE
        CPI  'F'
        JZ   FNOTE
        CPI  'G'
        JZ   GNOTE
        CPI  'R'
        JZ   RESTN
        LXI  D,EHBUF
        CALL TNOUA
        POP  H
        JMP  MODIF
RESTN   MVI  A,0
        RET
ANOTE   LDAX D
        INX  D
        CPI  '3'
        JNZ  AN1
        MVI  A,6
        JMP  SHART
```

```
AN1     CPI   '4'
        JNZ   AN2
        MVI   A,18
        JMP   SHART
AN2     CPI   '5'
        JNZ   NONOT
        MVI   A,30
        JMP   SHART
BNOTE   LDAX  D
        INX   D
        CPI   '3'
        JNZ   BN1
        MVI   A,8
        JMP   SHART
BN1     CPI   '4'
        JNZ   BN2
        MVI   A,20
        JMP   SHART
BN2     CPI   '5'
        JNZ   NONOT
        MVI   A,32
        JMP   SHART
CNOTE   LDAX  D
        INX   D
        CPI   '4'
        JNZ   CN1
        MVI   A,9
        JMP   SHART
CN1     CPI   '5'
        JNZ   CN2
        MVI   A,21
        JMP   SHART
CN2     CPI   '6'
        JNZ   NONOT
        MVI   A,33
        JMP   SHART
DNOTE   LDAX  D
        INX   D
        CPI   '4'
        JNZ   DN1
        MVI   A,11
        JMP   SHART
DN1     CPI   '5'
        JNZ   DN2
        MVI   A,23
        JMP   SHART
DN2     CPI   '6'
        JNZ   NONOT
        MVI   A,35
        JMP   SHART
ENOTE   LDAX  D
        INX   D
        CPI   '3'
        JNZ   EN1
        MVI   A,1
        JMP   SHART
EN1     CPI   '4'
        JNZ   EN2
        MVI   A,13
        JMP   SHART
```

```
EN2    CPI   '5'
       JNZ   EN3
       MVI   A,25
       JMP   SHART
EN3    CPI   '6'
       JNZ   NONOT
       MVI   A,37
       JMP   SHART
FNOTE  LDAX  D
       INX   D
       CPI   '3'
       JNZ   FN1
       MVI   A,2
       JMP   SHART
FN1    CPI   '4'
       JNZ   FN2
       MVI   A,14
       JMP   SHART
FN2    CPI   '5'
       JNZ   FN3
       MVI   A,26
       JMP   SHART
FN3    CPI   '5'  '6'
       JNZ   NONOT
       MVI   A,38
       JMP   SHART
GNOTE  LDAX  D
       INX   D
       CPI   '3'
       JNZ   GN1
       MVI   A,5
       JMP   SHART
GN1    CPI   '4'
       JNZ   GN2
       MVI   A,17
       JMP   SHART
GN2    CPI   '5'
       JNZ   NONOT
       MVI   A,29
SHART  PUSH  H
       LDAX  D
       CPI   '#'
       JNZ   NSHRP
       POP   H
       INR   A
       RET
NSHRP  POP   H
       RET
NONOT  LXI   D,EHBUF
       CALL  TNOUA
       JMP   MODIF
*
* DETERMINE WHAT THE NOTE IS FROM THE HEX CODED VALUE
* (JUST THE OPPOSITE OF NOINP)
*
TYPER  CPI   18
       JP    TYN11
       CPI   0
       JNZ   TYN01
       CALL  RSOUT
```

```
2;141         RET
2;142  TYN01  CPI   1
2;143         JNZ   TYN02
2;144         CALL  EOUT
2;145         CALL  Z3OUT
2;146         RET
2;147  TYN02  CPI   4
2;148         JP    TYN03
2;149         CALL  FOUT
2;150         CALL  Z3OUT
2;151         CPI   3
2;152         RNZ
2;153         CALL  SHARP
2;154         RET
2;155  TYN03  CPI   6
2;156         JP    TYN04
2;157         CALL  GOUT
2;158         CALL  Z3OUT
2;159         CPI   5
2;160         RNZ
2;161         CALL  SHARP
2;162         RET
2;163  TYN04  CPI   8
2;164         JP    TYN05
2;165         CALL  AOUT
2;166         CALL  Z3OUT
2;167         CPI   7
2;168         RNZ
2;169         CALL  SHARP
2;170         RET
2;171  TYN05  CPI   8
2;172         JNZ   TYN06
2;173         CALL  BOUT
2;174         CALL  Z3OUT
2;175         RET
2;176  TYN06  CPI   11
2;177         JP    TYN07
2;178         CALL  COUT
2;179         CALL  Z4OUT
2;180         CPI   10
2;181         RNZ
2;182         CALL  SHARP
2;183         RET
2;184  TYN07  CPI   13
2;185         JP    TYN08
2;186         CALL  DOUT
2;187         CALL  Z4OUT
2;188         CPI   12
2;189         RNZ
2;190         CALL  SHARP
2;191         RET
2;192  TYN08  CPI   13
2;193         JNZ   TYN09
2;194         CALL  EOUT
2;195         CALL  Z4OUT
2;196         RET
2;197  TYN09  CPI   16
2;198         JP    TYN10
2;199         CALL  FOUT
2;200         CALL  Z4OUT
2;201         CPI   15
2;202         RNZ
2;203         CALL  SHARP
2;204         RET
2;205  TYN10  CPI   18
2;206         JP    TYN11
2;207         CALL  GOUT
2;208         CALL  Z4OUT
2;209         CPI   17
2;210         RNZ
2;211         CALL  SHARP
2;212         RET
2;213  TYN11  CPI   20
2;214         JP    TYN12
2;215         CALL  AOUT
2;216         CALL  Z4OUT
2;217         CPI   19
2;218         RNZ
2,219         CALL  SHARP
2;220         RET
2;221  TYN12  CPI   20
2;222         JNZ   TYN13
2;223         CALL  BOUT
2;224         CALL  Z4OUT
2;225         RET
2;226  TYN13  CPI   23
2;227         JP    TYN14
2;228         CALL  COUT
2;229         CALL  Z5OUT
2;230         CPI   22
2;231         RNZ
2;232         CALL  SHARP
2;233         RET
2;234  TYN14  CPI   25
2;235         JP    TYN15
2;236         CALL  DOUT
2;237         CALL  Z5OUT
2;238         CPI   24
2;239         RNZ
2;240         CALL  SHARP
2;241         RET
2;242  TYN15  CPI   25
2;243         JNZ   TYN16
2;244         CALL  EOUT
2;245         CALL  Z5OUT
2;246         RET
2;247  TYN16  CPI   28
2;248         JP    TYN17
2;249         CALL  FOUT
2;250         CALL  Z5OUT
3;001         CPI   27
3;002         RNZ
3;003         CALL  SHARP
3;004         RET
3;005  TYN17  CPI   30
3;006         JP    TYN18
3;007         CALL  GOUT
3;008         CALL  Z5OUT
3;009         CPI   29
3;010         RNZ
```

```
        CALL  SHARP
        RET
TYN18   CPI   32
        JP    TYN19
        CALL  AOUT
        CALL  Z5OUT
        CPI   31
        RNZ
        CALL  SHARP
        RET
TYN19   CPI   32
        JNZ   TYN20
        CALL  BOUT
        CALL  Z5OUT
        RET

TYN20   CPI   35
        JP    TYN21
        CALL  COUT
        CALL  Z6OUT
        CPI   34
        RNZ
        CALL  SHARP
        RET
TYN21   CPI   37
        JP    TYN22
        CALL  DOUT
        CALL  Z6OUT
        CPI   36
        RNZ
        CALL  SHARP

        RET
TYN22   CPI   37
        JNZ   TYN23
        CALL  EOUT
        CALL  Z6OUT
        RET
TYN23   CPI   40
        JP    ERROR
        CALL  FOUT
        CALL  Z6OUT
        CPI   39
        RNZ
        CALL  SHARP
        RET
ERROR   PUSH  D

        PUSH  M
        LXI   D,BDNOT
        CALL  TNOUA
        CALL  CRLF
        POP   M
        POP   D
        RET
*
* DETERMINE NOTE DURATION FROM SUM OF NUMBER OF HEX CODES
* FOR THAT NOTE IN SERIAL MEMORY LOCATIONS
*
TIMER   PUSH  M
        PUSH  H
        PUSH  D
        PUSH  B
```

```
3;071        MVI   C,0
3;072        JMP   TMO
3;073 TMAT   LDAX  D
3;074 TMO    MOV   B,A
3;075 TM1    MOV   A,B
3;076        INX   D
3;077        LDAX  D
3;078        CMP   B
3;079        JNZ   NEXIT
3;080        INR   C
3;081        INX   D
3;082        JMP   TMAT
3;083 NEXIT  XCHG
3;084        DCX   H
3;085        SHLD  PRLOC
3;086        LXI   D,DURAB
3;087 CL1    MOV   A,C
3;088        CPI   40
3;089        JM    CL2
3;090        SUI   40
3;091        MOV   C,A
3;092        MVI   A,0
3;093        STAX  D
3;094        INX   D
3;095        JMP   CL1
3;096 CL2    CPI   20
3;097        JM    CL3
3;098        SUI   20
3;099        MOV   C,A
3;100        MVI   A,1
3;101        STAX  D
3;102        INX   D
3;103        JMP   CL1
3;104 CL3    CPI   10
3;105        JM    CL4
3;106        SUI   10
3;107        MOV   C,A
3;108        MVI   A,2
3;109        STAX  D
3;110        INX   D
3;111        JMP   CL1
3;112 CL4    CPI   5
3;113        JM    CL5
3;114        SUI   5
3;115        MOV   C,A
3;116        MVI   A,3
3;117        STAX  D
3;118        INX   D
3;119        JMP   CL1
3;120 CL5    CPI   3
3;121        JM    RETP
3;122        SUI   3
3;123        MOV   C,A
3;124        MVI   A,4
3;125        STAX  D
3;126        INX   D
3;127        JMP   CL1
3;128 RETP   MVI   A,0FEH
3;129        STAX  D
3;130        LXI   D,DURAD
3;131        LXI   H,2126H
3;132 RE0    LDAX  D
3;133        INX   D
3;134        CPI   0FEH
3;135        JZ    DUNIT
3;136        CPI   0
3;137        JNZ   RE1
3;138        CALL  POSCR
3;139        INR   H
3;140        PUSH  D
3;141        LXI   D,WHOLE
3;142        CALL  TNOUA
3;143        POP   D
3;144        JMP   RE0
3;145 RE1    CPI   1
3;146        JNZ   RE2
3;147        CALL  POSCR
3;148        INR   H
3;149        PUSH  D
3;150        LXI   D,HALF
3;151        CALL  TNOUA
3;152        POP   D
3;153        JMP   RE0
3;154 RE2    CPI   2
3;155        JNZ   RE3
3;156        CALL  POSCR
3;157        INR   H
3;158        PUSH  D
3;159        LXI   D,QUART
3;160        CALL  TNOUA
3;161        POP   D
3;162        JMP   RE0
3;163 RE3    CPI   3
3;164        JNZ   RE4
3;165        CALL  POSCR
3;166        INR   H
3;167        PUSH  D
3;168        LXI   D,EIGHT
3;169        CALL  TNOUA
3;170        POP   D
3;171        JMP   RE0
3;172 RE4    CPI   4
3;173        JNZ   RE5
3;174        CALL  POSCR
3;175        INR   H
3;176        PUSH  D
3;177        LXI   D,SIXTE
3;178        CALL  TNOUA
3;179        POP   D
3;180        JMP   RE0
3;181 RE5    CALL  POSCR
3;182        INR   H
3;183        PUSH  D
3;184        LXI   D,UFON
3;185        CALL  TNOUA
3;186        POP   D
3;187        JMP   RE0
3;188 DUNIT  LXI   D,DURAB
```

```
        MVI  B,20
        MVI  A,0FEH
DNTLP   STAX D
        INX  D
        DCR  B
        JNZ  DNTLP
        POP  B
        POP  D
        POP  H
        POP  M
        RET
*
* CURSOR POSITIONING ROUTINE
*
POSCR   PUSH M
        MVI  A,1BH
        CALL OUTT
        MVI  A,'='
        CALL OUTT
        MOV  A,H
        CALL OUTT
        MOV  A,L
        CALL OUTT
        POP  M
        RET
*
* ALPHA NOTE DESIGNATION OUT TO TERMINAL ROUTINE
*
AOUT    PUSH M
        MVI  A,'A'
        CALL OUTT
        POP  M
        RET
BOUT    PUSH M
        MVI  A,'B'
        CALL OUTT
        POP  M
        RET
COUT    PUSH M
        MVI  A,'C'
        CALL OUTT
        POP  M
        RET
DOUT    PUSH M
        MVI  A,'D'
        CALL OUTT
        POP  M
        RET
EOUT    PUSH M
        MVI  A,'E'
        CALL OUTT
        POP  M
        RET
FOUT    PUSH M
        MVI  A,'F'
        CALL OUTT
        POP  M
        RET
```

```
GOUT   PUSH M
       MVI  A,'G'
       CALL OUTT
       POP  M
       RET
RSOUT  PUSH M
       MVI  A,'R'
       CALL OUTT
       MVI  A,'E'
       CALL OUTT
       MVI  A,'S'
       CALL OUTT
       MVI  A,'T'
       CALL OUTT
       POP  M
       RET
Z3OUT  PUSH M
       MVI  A,'3'
       CALL OUTT
       POP  M
       RET
Z4OUT  PUSH M
       MVI  A,'4'
       CALL OUTT
       POP  M
       RET
Z5OUT  PUSH M
       MVI  A,'5'
       CALL OUTT
       POP  M
       RET
Z6OUT  PUSH M
       MVI  A,'6'
       CALL OUTT
       POP  M
       RET
SHARP  PUSH M
       MVI  A,'#'
       CALL OUTT
       POP  M
       RET
*
* MAIN STORAGE SECTION--HERE'S THE GOODIES FOLKS
*
CINDI  DW   0
REENT  DW   0
FRLOC  DW   0
LRLOC  DW   0
LONOT  DW   0
HINOT  DW   0
SCNED  DW   0
MODED  DW   0
IBUFR  DS   10
DURAB  DW   0FEFEH
       DS   20
GODBF  DB   8
       DB   1AH
```

```
4;054        DW    3D1BH
4;055        DW    'E '
4;056        DW    'OG'
4;057        DB    'D'
4;058 EHBUF  DB    4
4;059        DW    'HE'
4;060        DW    ' ?'

4;061 SPC4   DB    4
4;062        DW    '  '
4;063        DW    '  '
4;064 WHOLE  DB    17
4;065        DW    '  '
4;066        DW    '  '
4;067        DW    '  '
4;068        DW    'W '
4,069        DW    'OH'
4;070        DW    'EL'
4;071        DW    'N '
4;072        DW    'TO'
4;073        DB    'E'
4;074 HALF   DB    17
4;075        DW    '  '

4;076        DW    '  '
4;077        DW    '  '
4;078        DW    '  '
4;079        DW    'AH'
4;080        DW    'FL'
4;081        DW    'N '
4;082        DW    'TO'
4;083        DB    'E'
4;084 QUART  DB    17
4;085        DW    '  '
4;086        DW    '  '
4;087        DW    'Q '
4;088        DW    'AU'
4;089        DW    'TR'
4;090        DW    'RE'

4;091        DW    'N '
4;092        DW    'TO'
4;093        DB    'E'
4;094 EIGHT  DB    17
4;095        DW    '  '
4;096        DW    '  '
4;097        DW    '  '
4;098        DW    'IE'
4;099        DW    'HG'
4;100        DW    'HT'
4;101        DW    'N '
4;102        DW    'TO'
4;103        DB    'E'
4;104 SIXTE  DB    17
4;105        DW    '  '

4;106        DW    'S '
4;107        DW    'XI'
4;108        DW    'ET'
4;109        DW    'NE'
4;110        DW    'HT'
4;111        DW    'N '
4;112        DW    'TO'
4;113        DB    'E'
4;114 UFON   DB    17
4;115        DW    'NU'
4;116        DW    'DI'
4;117        DW    'NE'
4;118        DW    'IT'
4;119        DW    'IF'
4;120        DW    'DE'

4;121        DW    'N '
4;122        DW    'TO'
4;123        DB    'E'
4;124 BDNOT  DB    12
4;125        DW    'NI'
4;126        DW    'AV'
4;127        DW    'IL'
4;128        DW    ' D'
4;129        DW    'AD'
4;130        DW    'AT'
4;131 SBUF1  DB    60
4;132        DW    0D0DH
4;133        DW    0D0DH
4;134        DW    'ON'
4;135        DW    'ET'

4;136        DW    'E '
4;137        DW    'ID'
4;138        DW    'OT'
4;139        DW    ' R'
4;140        DW    'EV'
4;141        DW    ' R'
4;142        DW    '.4'
4;143        DW    ' O'
4;144        DW    0D0DH
4;145        DW    'NE'
4;146        DW    'ET'
4;147        DW    ' R'
4;148        DW    'OL'
4;149        DW    'EW'
4;150        DW    ' R'

4;151        DW    'DA'
4;152        DW    'RD'
4;153        DW    'SE'
4;154        DW    ' S'
4;155        DW    'FO'
4;156        DW    'N '
4;157        DW    'TO'
4;158        DW    ' E'
4;159        DW    'AD'
4;160        DW    'AT'
4;161        DW    ' :'
4;162 HIABF  DB    36
4;163        DW    0D0DH
4;164        DW    'NE'
4;165        DW    'ET'

4;166        DW    ' R'
4;167        DW    'PU'
```

```
4;168        DW    'EP'
4;169        DW    ' R'
4;170        DW    'DA'
4;171        DW    'RD'
4;172        DW    'SE'
4;173        DW    ' S'
4;174        DW    'FO'
4;175        DW    'N '
4;176        DW    'TO'
4;177        DW    ' E'
4;178        DW    'AD'
4;179        DW    'AT'
4;180        DW    ' :'

4;181 HEDER  DB    39
4;182        DB    1AH
4;183        DW    'ON'
4;184        DW    'ET'
4,185        DW    '  '
4;186        DW    '  '
4;187        DW    '  '
4;188        DW    '  '
4;189        DW    'UD'
4;190        DW    'AR'
4;191        DW    'IT'
4;192        DW    'NO'
4;193        DW    'S('
4;194        DW    ' )'
4;195        DW    '  '

4;196        DW    'M '
4;197        DW    'ME'
4;198        DW    'RO'
4;199        DW    ' Y'
4;200        DW    'AM'
4;201        DB    'P'
4;202        DB    0DH
4;203 GVBBF  DB    18
4;204        DW    0D0DH
4;205        DW    'NE'
4;206        DW    'ET'
4;207        DW    ' R'
4;208        DW    'UF'
4;209        DW    'CN'
4;210        DW    'IT'

4;211        DW    'NO'
4;212        DW    '--'
4;213 MSGNN  DB    24
4;214        DW    'NE'
4;215        DW    'ET'
4;216        DW    ' R'
4;217        DW    'ER'
4;218        DW    'LP'
4;219        DW    'CA'
4;220        DW    'ME'
4;221        DW    'NE'
4;222        DW    ' T'
4;223        DW    'ON'
4;224        DW    'ET'
4;225        DW    ' :'

4;226 ENBF1  DB    32
```

```
4;227        DW    0D0DH
4;228        DW    0D0DH
4;229        DW    'OL'
4;230        DW    'EW'
4;231        DW    ' R'
4;232        DW    'DA'
4;233        DW    'RD'
4;234        DW    'SE'
4;235        DW    ' S'
4;236        DW    'FO'
4;237        DW    'N '
4;238        DW    'TO'
4;239        DW    ' E'
4;240        DW    'AD'

4;241        DW    'AT'
4;242        DW    ' :'
4,243 ENBF2  DB    33
4;244        DW    '  '
4;245        DW    '  '
4;246        DW    '  '
4;247        DW    '  '
4;248        DW    'UN'
4;249        DW    'BM'
4;250        DW    'RE'
5;001        DW    'O '
5;002        DW    ' F'
5;003        DW    'ON'
5;004        DW    'ET'
5;005        DW    ' S'

5;006        DW    'CS'
5;007        DW    'NA'
5;008        DW    'EN'
5;009        DW    ':D'
5;010        DB    ' '
5;011 ENBF3  DB    30
5;012        DW    0D0DH
5;013        DW    'PU'
5;014        DW    'EP'
5;015        DW    ' R'
5;016        DW    'DA'
5;017        DW    'RD'
5;018        DW    'SE'
5;019        DW    ' S'
5;020        DW    'FO'

5;021        DW    'N '
5;022        DW    'TO'
5;023        DW    ' E'
5;024        DW    'AD'
5;025        DW    'AT'
5;026        DW    ' :'
5;027 ENBF4  DB    34
5;028        DW    '  '
5;029        DW    '  '
5;030        DW    '  '
5;031        DW    '  '
5;032        DW    'UN'
5;033        DW    'BM'
5;034        DW    'RE'
5;035        DW    'O '

5;036        DW    ' F'
```

```
5;037        DW    'ON'
5;038        DW    'ET'
5;039        DW    ' S'
5;040        DW    'OM'
5;041        DW    'ID'
5;042        DW    'IF'
5;043        DW    'DE'
5;044        DW    ' !'
5;045 ENDF5  DB    40
5;046        DW    3D1DH
5;047        DW    '=+'
5;048        DW    'ON'
5;049        DW    'ET'
5;050        DW    'E '
5;051        DW    'ID'
5;052        DW    'OT'
5;053        DW    ' R'
5;054        DW    'EV'
5;055        DW    ' R'
5;056        DW    '.4'
5;057        DB    '0'
5;058        DW    3D1BH
5;059        DW    '@-'
5;060        DW    'OG'
5;061        DW    ' D'
5;062        DW    'LB'
5;063        DW    'SE'
5;064        DW    ' S'
5;065        DW    'OY'


5;066        DW    '!U'
5;067        END

OK--LO $MUPR
+++++++++++++++++++++++++++++++++++++++++++++++++++
$MUPR 5000 7FFD


$MUPR   5000  7FFD  80FE


1;001 ****************************************
1;002 *                                      *
1;003 * MEMORY TO PRINTER NOTE DUMP ROUTINE *
1;004 *                                      *
1;005 ****************************************
1;006 *
1;007 * ASSEMBLE TO EXECUTE FROM C000 (HEX) VIA
1;008 * OK--ASSM C000 C000 5000
1;009 *
1;010 *
1;011 *
1;012 *
1;013 *
1;014 * 06/14/78----VER 4.0
1;015 *


1;016        JMP   TMAIN
1;017 TIN    JMP   TIN
1;018 OUTT   JMP   OUTT
1;019 CRLF   JMP   CRLF
1;020 TMAIN  POP   H
```

```
        SHLD REENT
        LXI  D,3
        DAD  D
        SHLD TIN+1
        DAD  D
        SHLD OUTT+1
        DAD  D
        SHLD CRLF+1
        CALL CRLF          ;PRETTY UP THE TERMINAL
        CALL CRLF

        LXI  D,MSGLO       ;GET ADDRESS OF MESSAGE
        MVI  B,13          ;GET MESSAGE LENGTH IN BYTES
        CALL TNOUA         ;PRINT IT ON TERMINAL
        CALL HEXIN         ;GET LOW ADDRESS FROM TERMINAL
        SHLD LOAD          ;GO STORE IT SOMEWHERE
        CALL CRLF          ;PRETTY UP TERMINAL
        LXI  D,MSGHI       ;GET ADDRESS OF NEXT MESSAGE
        MVI  B,14          ;GET MESSAGE LENGTH IN BYTES
        CALL TNOUA         ;PRINT IT ON TERMINAL
        CALL HEXIN         ;GET HIGH ADDRESS FROM TERMINAL
        INX  H             ;BUMP IT UP BY ONE
        SHLD HIAD          ;AND GO STORE IT TOO
        CALL CRLF          ;PRETTY UP THE TERMINAL
        CALL CRLF
        LHLD LOAD          ;GET THE LOW ADDRESS

        XCHG               ;PUT INTO D,E FOR INDEX
        LHLD HIAD          ;GET HIGH ADDRESS FOR COMPARE
DLOOP   MOV  A,D           ;PUT D INTO A
        CALL HXPRT         ;PRINT ON PRINTER
        MOV  A,E           ;PUT E INTO A
        CALL HXPRT         ;PRINT ON PRINTER--PRESENT ADDRESS
        CALL PSPC4         ;PRINT 4 SPACES ON PRINTER
        LDAX D             ;GET CONTENTS OF ADDRESS IN D,E
        CALL HXPRT         ;AND PRINT ON PRINTER
        CALL RECOG         ;NOW DETERMINE NOTE (A5# ETC.)
        INX  D             ;BUMP UP THE INDEX
        MOV  A,D           ;PUT D INTO A
        CMP  H             ;SEE IF DONE
        JNZ  DLOOP         ;IF NOT GO LOOP
        MOV  A,E           ;PUT E INTO A

        CMP  L             ;SEE IF DONE
        JNZ  DLOOP         ;IF NOT GO LOOP
        CALL PRCR8         ;PRINT 8 CR/LF'S ON PRINTER
        LHLD REENT         ;GET OS RE-ENTRY POINT
        PCHL               ;AND EXIT BACK TO OS
*
* NOTE RECOGNIZER
*
RECOG   CALL PSPC4
        LDAX D
        CPI  9
        JP   NEX01
        MVI  C,3
        CPI  1
        JZ   EOUT

        CPI  2
        JZ   FOUT
```

```
1;078         CPI   3
1,079         JZ    FOUT
1;080         CPI   4
1;081         JZ    GOUT
1;082         CPI   5
1;083         JZ    GOUT
1;084         CPI   6
1;085         JZ    AOUT
1;086         CPI   7
1;087         JZ    AOUT
1;088         CPI   8
1;089         JZ    BOUT
1;090  NEX01  MVI   C,4
1;091         CPI   21
1;092         JP    NEX02
1;093         CPI   9
1;094         JZ    COUT
1;095         CPI   10
1;096         JZ    COUT
1;097         CPI   11
1;098         JZ    DOUT
1;099         CPI   12
1;100         JZ    DOUT
1;101         CPI   13
1;102         JZ    EOUT
1;103         CPI   14
1;104         JZ    FOUT
1;105         CPI   15
1;106         JZ    FOUT
1;107         CPI   16
1;108         JZ    GOUT
1;109         CPI   17
1;110         JZ    GOUT
1;111         CPI   18
1;112         JZ    AOUT
1;113         CPI   19
1;114         JZ    AOUT
1;115         CPI   20
1;116         JZ    BOUT
1;117  NEX02  MVI   C,5
1;118         CPI   33
1;119         JP    NEX03
1;120         CPI   21
1;121         JZ    COUT
1;122         CPI   22
1;123         JZ    COUT
1;124         CPI   23
1;125         JZ    DOUT
1;126         CPI   24
1;127         JZ    DOUT
1;128         CPI   25
1;129         JZ    EOUT
1;130         CPI   26
1;131         JZ    FOUT
1;132         CPI   27
1;133         JZ    FOUT
1;134         CPI   28
1;135         JZ    GOUT
1;136         CPI   29
1,137         JZ    GOUT
1;138         CPI   30
1;139         JZ    AOUT
1;140         CPI   31
1;141         JZ    AOUT
1;142         CPI   32
1;143         JZ    BOUT
1;144  NEX03  MVI   C,6
1;145         CPI   33
1;146         JZ    COUT
1;147         CPI   34
1;148         JZ    COUT
1;149         CPI   35
1;150         JZ    DOUT
1;151         CPI   36
1;152         JZ    DOUT
1;153         CPI   37
1;154         JZ    EOUT
1;155         CPI   38
1;156         JZ    FOUT
1;157         CPI   39
1;158         JZ    FOUT
1;159         CPI   40
1;160         JP    ERRNN
1;161  EOUT   MVI   A,'E'
1;162         CALL  PRINT
1;163         CALL  NUMBR
1;164         MVI   A,0DH
1;165         CALL  PRINT
1;166         RET
1;167  ERRNN  MVI   A,'*'
1;168         CALL  PRINT
1;169         CALL  PRINT
1;170         CALL  PRINT
1;171         MVI   A,0DH
1;172         CALL  PRINT
1;173         RET
1;174  FOUT   MOV   B,A
1;175         MVI   A,'F'
1;176         CALL  PRINT
1;177         CALL  NUMBR
1;178         MOV   A,B
1;179         CPI   3
1;180         JZ    SHARP
1;181         CPI   15
1;182         JZ    SHARP
1;183         CPI   27
1;184         JZ    SHARP
1;185         CPI   39
1;186         JZ    SHARP
1;187         MVI   A,0DH
1;188         CALL  PRINT
1;189         RET
1;190  GOUT   MOV   B,A
1;191         MVI   A,'G'
1;192         CALL  PRINT
1;193         CALL  NUMBR
1;194         MOV   A,B
1;195         CPI   5
1;196         JZ    SHARP
1;197         CPI   17
```

```
         JZ    SHARP
         CPI   29
         JZ    SHARP
         MVI   A,ODH
         CALL  PRINT
         RET
AOUT     MOV   B,A
         MVI   A,'A'
         CALL  PRINT
         CALL  NUMBR
         MOV   A,B
         CPI   7
         JZ    SHARP
         CPI   19
         JZ    SHARP
         CPI   31
         JZ    SHARP
         MVI   A,ODH
         CALL  PRINT
         RET
BOUT     MVI   A,'B'
         CALL  PRINT
         CALL  NUMBR
         MVI   A,ODH
         CALL  PRINT
         RET
COUT     MOV   B,A
         MVI   A,'C'
         CALL  PRINT
         CALL  NUMBR
         MOV   A,B
         CPI   10
         JZ    SHARP
         CPI   22
         JZ    SHARP
         CPI   34
         JZ    SHARP
         MVI   A,ODH
         CALL  PRINT
         RET
DOUT     MOV   B,A
         MVI   A,'D'
         CALL  PRINT
         CALL  NUMBR
         MOV   A,B
         CPI   12
         JZ    SHARP
         CPI   24
         JZ    SHARP
         CPI   36
         JZ    SHARP
         MVI   A,ODH
         CALL  PRINT
         RET
SHARP    MVI   A,'#'
         CALL  PRINT
         MVI   A,ODH
         CALL  PRINT
         RET
NUMBR    MOV   A,C
         ANI   OFH
         ADI   30H
         CALL  PRINT
         RET
*
* BUFFER OUTPUT TO TERMINAL
*
TNOUA    LDAX  D
         INX   D
         CALL  OUTT
         DCR   B
         JNZ   TNOUA
         RET
*
* PUT OUT 8 CR/LF'S TO PRINTER
*
PRCR8    MVI   B,8
         MVI   A,ODH
LOPRP    CALL  PRINT
         DCR   B
         JNZ   LOPRP
         RET
*
* PUT OUT 4 SPCS TO PRINTER
*
PSPC4    MVI   B,4
         MVI   A,' '
LOPR1    CALL  PRINT
         DCR   B
         JNZ   LOPR1
         RET
*
* DUMP AREG TO PRINTER IN HEX
*
HXPRT    PUSH  M
         RRC
         RRC
         RRC
         RRC
         CALL  HOUT1
         POP   M
HOUT1    ANI   OFH
         ADI   30H
         CPI   3AH
         JM    HG01
         ADI   7
HG01     CALL  PRINT
         RET
*
* HEXADECIMAL INPUT ROUTINE
*
HEXIN    MVI   B,4
         LXI   H,0
HXLOP    DAD   H
         DAD   H
```

```
        DAD   H
        DAD   H
        CALL  TIN

        SUI   30H
        CPI   0AH
        JM    HXINK
        SUI   7
HXINK   ADD   L
        MOV   L,A
        DCR   B
        JNZ   HXLOP
        RET
*
* ACTUAL PRINT ROUTINE
*
PRINT   PUSH  H
        PUSH  D
        PUSH  B

        PUSH  M
        ANI   7FH         MASK OFF PARITY BIT
        CPI   0AH
        JZ    LF
        CPI   0DH
        JZ    LINE
        ADI   80H         MODIFY  DISPLACEMENT
        JC    EXIT
        SUI   0A0H
        JC    EXIT        IF < 40 NOT PRINTABLE
OK      LHLD  TXPTR
        MOV   M,A         STUFF INTO MEMORY
        INX   H           BUMP UP THE POINTER BY 1
        CALL  HH
        LXI   D,ENDBF     POINT D,E TO END OF BUFFER

        MOV   A,H         TEST FOR......
        CMP   D           ...H,L=D,E
        JNZ   EXIT        EXIT IF NOT EQUAL
        MOV   A,L
        CMP   E
        JZ    LINE        IF END OF LINE THEN PRINT IT
EXIT    POP   M
        POP   B
        POP   D
        POP   H
        RET               GO BACK TOCALLING PROGRAM
*
*
LINE    CALL  HOME
        MVI   A,0FEH

        CALL  MOTOR       ISSUE THE COMMAND
LINLP   CALL  CNTIN       'KEEP UP THE ACTION'
        IN    PTR1        GET PRINTER STATUS
        ANI   4
        JZ    LINLP
        CALL  PRNTR       PRINT OUT LINE BUFFER
        CALL  NWBFR       ERASE LINE BUFFER
LF      MVI   A,0FBH
        CALL  MOTOR
        LHLD  SOLON
```

```
        CALL MRKTM
        LHLD SOLOF
        CALL WASTE
        JMP  EXIT
*

* ROUTINE TO PRINT THE BUFFER
* TERMINATES UPON FINDING A='FFH' (EQT)
*
PRNTR LXI  H,LNBFR
      SHLD IXREG
TXFCH MOV  L,M
      SUB  A
      MOV  H,A
      MOV  A,L
      ANI  80H
      JNZ  HOME
      MOV  D,H
      MOV  E,L
      DAD  H
      DAD  H

      DAD  D
      LXI  D,FNTBL
      DAD  D
      MVI  B,5
FNFCH MOV  C,M
      PUSH H
      CALL FNTOT
      POP  H
      INX  H
      DCR  B
      JNZ  FNFCH
      LHLD INCHR
      CALL MRKTM
NXCHR LHLD IXREG
      INX  H

      SHLD IXREG
      JMP  TXFCH
FNTOT CALL CNTIN
      MOV  A,C
      CMA
      ANI  7FH
      OUT  PTR1
      LHLD HAMON
      CALL WASTE
      LHLD HAMOF
MRKTM MOV  A,L
      ORA  H
      RZ
      CALL CNTIN
      DCX  H

      JMP  MRKTM
WASTE DCX  H
      MOV  A,L
      ORA  H
      JNZ  WASTE
      RET
HOME  IN   PTR1
      ANI  4
```

```
        RZ
        MVI  A,0FDH
        CALL MOTOR
HOMLP   CALL CNTIN
        IN   PTR1
        ANI  4
        JNZ  HOMLP

        LHLD OVRUN
        CALL MRKTM
        MVI  A,0FFH
MOTOR   STA  PTCMD
ASYNC   IN   PTR1
        ANI  1
        MOV  L,A
ACLOP   IN   PTR1
        ANI  1
        XRA  L
        JZ   ACLOP
CNTIN   MVI  A,7FH
        OUT  PTR1
        LDA  PTCMD
        OUT  PTR1

        RET
NWBFR   LXI  H,LNBFR
HH      MVI  M,0FFH
        SHLD TXPTR
        RET
*
* NUMBERS AND PUNCTUATION
*
FNTBL   DW   0000
        DW   0000
        DB   80H
        DW   0000
        DW   007DH
        DB   80H
        DW   0C00H

        DW   0C00H
        DB   80H
        DW   7F30H
        DW   7F30H
        DB   0B0H
        DW   4A12H
        DW   4A7FH
        DB   0A8H
        DW   2C0EH
        DW   1340H
        DB   8BH
        DW   453AH
        DW   0A35H
        DB   0A5H
        DW   0C10H

        DW   0000H
        DB   80H
        DW   057AH
        DW   0000
        DB   80H
        DW   0000
        DW   0500H
        DB   0FAH
        DW   704AH
        DW   707FH
        DB   0CAH
        DW   4040H
        DW   407AH
        DB   0C0H
        DW   2201H

        DW   0000
        DB   80H
        DW   4040H
        DW   4040H
        DB   0C0H
        DW   0000
        DW   0001H
        DB   80H
        DW   2002H
        DW   1040H
        DB   88H
        DW   257AH
        DW   1545H
        DB   0FAH
        DW   0900H

        DW   017FH
        DB   80H
        DW   0709H
        DW   2525H
        DB   0D9H
        DW   0506H
        DW   5545H
        DB   0AEH
        DW   3060H
        DW   7F28H
        DB   0A0H
        DW   151DH
        DW   1515H
        DB   0E6H
        DW   457AH

        DW   4545H
        DB   0AAH
        DW   040CH
        DW   4427H
        DB   9CH
        DW   453AH
        DW   4545H
        DB   0BAH
        DW   4510H
        DW   4545H
        DB   0FAH
        DW   3000H
        DW   0000
        DB   80H
        DW   4201H

        DW   0000
        DB   80H
        DW   3040H
        DW   050AH
```

```
3;045         DB    80H
3;046         DW    3030H
3;047         DW    3030H.
3;048         DB    0B0H
3;049         DW    0500H
3;050         DW    300AH
3;051         DB    0C0H
3;052         DW    0480H
3;053         DW    4425H
3;054         DB    98H
3;055 *

3;056 * UPPER CASE ALPHA
3;057 *
3;058         DW    057AH
3;059         DW    5555H
3;060         DB    9AH
3;061         DW    447BH
3;062         DW    4444H
3;063         DB    0FBH
3;064         DW    7F05H
3;065         DW    4545H
3;066         DB    0BAH
3;067         DW    057AH
3;068         DW    0505H
3;069         DB    8AH
3;070         DW    7F05H

3;071         DW    0505H
3;072         DB    0FAH
3;073         DW    457FH
3;074         DW    4545H
3;075         DB    85H
3;076         DW    447FH
3;077         DW    4444H
3;078         DB    84H
3;079         DW    057AH
3;080         DW    2525H
3;081         DB    0AAH
3;082         DW    407FH
3;083         DW    4040H
3;084         DB    0FFH
3;085         DW    0500H

3;086         DW    057FH
3;087         DB    80H
3;088         DW    0502H
3;089         DW    047EH
3;090         DB    80H
3;091         DW    407FH
3;092         DW    0A30H
3;093         DB    85H
3;094         DW    017FH
3;095         DW    0101H
3;096         DB    81H
3;097         DW    087FH
3;098         DW    0810H
3;099         DB    0FFH
3;100         DW    107FH

3;101         DW    2040H
3;102         DB    0FFH
```

```
3;103         DW    057AH
3;104         DW    0505H
3;105         DB    0FAH
3;106         DW    447FH
3;107         DW    4444H
3;108         DB    98H
3;109         DW    057AH
3;110         DW    0725H
3;111         DB    0FBH
3;112         DW    447FH
3;113         DW    4664H
3;114         DB    99H
3;115         DW    451AH

3;116         DW    4545H
3;117         DB    0AAH
3;118         DW    0404H
3;119         DW    047FH
3;120         DB    84H
3;121         DW    017EH
3;122         DW    0101H
3;123         DB    0FEH
3;124         DW    027CH
3;125         DW    0201H
3;126         DB    0FCH
3;127         DW    027FH
3;128         DW    0260H
3;129         DB    0FFH
3;130         DW    300FH

3;131         DW    3040H
3;132         DB    8FH
3;133         DW    100CH
3;134         DW    1063H
3;135         DB    8CH
3;136         DW    2507H
3;137         DW    1545H
3;138         DB    8DH
3;139         DW    7F00H
3;140         DW    0505H
3;141         DB    80H
3;142         DW    1008H
3;143         DW    2040H
3;144         DB    82H
3;145         DW    0500H

3;146         DW    7F05H
3;147         DB    80H
3;148         DW    0408H
3;149         DW    0404H
3;150         DB    88H
3;151         DW    0101H
3;152         DW    0101H
3;153         DB    81H
3;154 *
3;155 * DELAY CONSTANTS
3;156 *
3;157 SOLON DW    0190H
3;158 SOLOF DW    10D2H
3;159 OVRUN DW    01C0H
3;160 INCHR DW    001DH
3;161 HAMON DW    0030H
3;162 HAMOF DW    0011H
```

```
3;163 *
3;164 * TEMPORARY STORAGE AREAS
3;165 *
3;166 REENT DW    0000
3;167 IXREG DW    0000
3;168 PTCMD DB    00
3;169 LNBFR DB    0FFH
3;170       DS    5EH
3;171 TXPTR DW    LNBFR
3;172 ENDBF DB    00
3;173 PTR1  EQU   0
3;174 OTMP  DB    0
3;175 INTMP DB    0


3;176 HXTMP DB    0
3;177 LOAD  DW    0
3;178 HIAD  DW    0
3;179 MSGLO DW    'OL'
3;180       DW    ' W'
3;181       DW    'DA'
3;182       DW    'RD'
3;183       DW    'SE'
3;184       DW    ':S'
3;185       DB    ' '
3;186 MSGHI DW    'IH'
3;187       DW    'HG'
3;188       DW    'A '
3;189       DW    'DD'
3;190       DW    'ER'


3;191       DW    'SS'
3;192       DW    ' :'
3;193 HXPTM DB    0
3;194       END


$MUPR   5000   7FFD   80FE
```

What is claimed is:

1. A system for translating a series of analog signals having characteristic frequencies and durations into written indicia representing said signals, said system comprising:

means for converting said analog signals into a corresponding series of electrical signals having corresponding characteristic frequencies and durations;

means for generating a series of digital signals corresponding to said electrical signals, said series of digital signals reflecting the characteristic frequencies of said corresponding analog signals and for counting the number of digital signals occuring in said latter series during successive time intervals of predetermined length to produce counts having values corresponding to the frequencies and durations of said analog signals;

means for producing a series of indicia codes from the counts produced by said generating and counting means, said series of indicia codes corresponding to said series of digital signals, each of said indicia codes also representing both the frequency and the duration of a corresponding one of said analog signals; and means for printing indicia representing said indicia codes on a record medium, said printing indicia identifying both the frequency and the duration of corresponding ones of said analog signals.

2. The system of claim 1 wherein said means for converting said analog signals into said electrical signals generates electrical signals having continuous transitions between positive values and negative values through a zero value.

3. The system of claim 2 wherein said means for generating and counting comprises frequency digitizer circuit means (a) for generating a pulse train of digital signals corresponding to said electrical signals, (b) for producing said counts by counting the number of signals in said pulse train occurring during cyclic time intervals of a predetermined duration, and (c) for storing said counts.

4. A system for translating a series of analog signals having characteristic frequencies and durations into written indicia representing such signals, said system comprising:

means for converting said analog signals into a corresponding series of electrical signals having corresponding characteristic frequencies and durations, said electrical signals having continuous transitions between positive values and negative values through a zero value;

means for generating a series of digital signals corresponding to said electrical signals, said series of digital signals reflecting the characteristic frequencies of said corresponding analog signals, and for counting the number of digital signals occurring in said latter series during successive time intervals of predetermined length to produce counts having values corresponding to the frequencies and durations of said analog signals, said generating and counting means comprising frequency digitizier circuit means (a) for generating a pulse train of digital signals corresponding to said electrical signals, (b) for producing said counts by counting the number of signals in said pulse train occurring during cyclic time intervals of a predetermined duration, and (c) for storing such counts, said frequency digitizer circuit means including:

comparator means for producing a series of digital pulses having leading edges and trailing edges, each leading edge of a said digital pulse coinciding with a transition in a said electrical signal from a positive value to a zero value, and each trailing edge of a said digital pulse coinciding with a transition of a said electrical signal from a negative value to a zero value;

pulse-doubling means for generating digital signals for each leading edge and for each trailing edge of said digital pulse;

pulse-combining means for producing a serial train of said digital signals generated by said pulse-doubling means;

means for counting the signals in said train of digital signals to produce counts of said signals corresponding to the frequencies thereof;

buffer means coupled to said counting means for receiving and storing said produced counts; and timer means coupled to said counting means and said buffer means (a) for cyclically transferring the contents of said counting means to said buffer means at uniform, predetermined time intervals, said transferred contents including a said count corresponding to the number of transitions from a positive value to a zero value and from a negative value to a zero value occurring in said analog signals during a said time interval, (b) for generating pulses to reset said counting means and said buffer means, and (c) for producing buffer-empyting pulses for initiating transfers of said counts stored in said buffer means to said producing means;

means for producing a series of indicia codes from the counts produced by said generating and counting means, said series of indicia codes corresponding to said series of digital signals, each of said indicia codes also representing both the frequency and the duration of a corresponding one of said analog signals; and means for printing indicia representing said indicia codes on a record medium, said printed indicia identifying both the frequency and the duration of corresponding ones of said analog signals.

5. The system of claim 4 wherein said means for producing said series of indicia codes comprises identifying means for receiving said transferred counts, said identifying means comprising:

means for determining the frequency of each of said analog signals from the value of said transferred count corresponding to a portion of said analog signal occurring during the period of one of said cyclic, predetermined times;

means for determining the duration of a said analog signal from the number of successively received counts having the same determined frequency; and means for generating a said indicia code corresponding to said determined frequency and duration for each of said analog signals.

6. The system of claim 5 wherein said printing means comprises an ink jet printer adapted to produce physical images of said indicia on a record medium.

7. The system of claim 5 wherein said producing means comprises a programmed digital computer.

8. A system for translating audio tones into written indicia representing said audio tones, said system comprising:

transducer means for converting said audio tones into corresponding electrical signals;

frequency digitizer circuit means (a) for generating a pulse train of digital signals corresponding to said electrical signals, (b) for producing counts corresponding to the duration of each of the audio tones by counting the number of signals in said pulse train occurring during cyclic time intervals of a predetermined duration, (c) for storing said counts and (d) for producing frequency indicia corresponding to the frequency of each of said audio tones;

means for producing a series of indicia codes from the counts and the frequency indicia produced by said frequency digitizer circuit means, said series of indicia codes corresponding to said pulse train of digital signals, each of said indicia codes representing both the frequency and the duration of a corresponding one of said audio tones; and means for printing visible images representing said indicia codes.

9. The system of claim 8 wherein said transducer means comprises a microphone and wherein said electrical signals include continuous transitions between positive values and negative values through a zero value.

10. A system for translating audio tones into written indicia representing said audio tones, said system comprising:

transducer means for converting said audio tones into corresponding electrical signals, said transducer means comprising a microphone and said electrical signals including continuous transitions between positive values and negative values through a zero value;

frequency digitizer circuit means (a) for generating a pulse train of digital signals corresponding to said electrical signals, (b) for producing counts corresponding to the duration of each of the audio tones by counting the number of signals in said pulse train occurring during cyclic time intervals of a predetermined duration, (c) for storing said counts, and (d) for producing frequency indicia corresponding to the frequency of each of said audio tones, said frequency digitizer circuit means comprising:

comparator means for producing a series of digital pulses having leading edges and trailing edges, each leading edge of a said digital pulse coinciding with a transition in a said electrical signal from a positive value to a zero value, and each trailing edge of a said digital pulse coinciding with a transition of a said electrical signal from a negative value to a zero value;

pulse-doubling means for generating a digital signal for each leading edge and for each trailing edge of a said digital pulse;

pulsing-combing means for producing said pulse train from said digital signals generated by said pulse-doubling means;

means for counting the signals in said pulse train of digital signals produced by said pulse-combining;

buffer means coupled to said counting means; and timer means coupled to said counting means and said buffer means (1) for cyclically transferring the contents of said counting means to said buffer means at uniform, predetermined time intervals, said transferred contents constituting a count corresponding to the number of transitions from a positive value to a zero value and from a negative value to a zero value occuring in said audio tone during a said time interval, (2) for generating pulses to reset said counting means and said buffer means, and (3) for producing buffer-emptying pulses for initiating transfers of said counts stored in said buffer means to said processing means;

means for producing a series of indicia codes from said counts and said frequency indicia produced by said frequency digitizer circuit means, said series of indicia codes corresponding to said pulse train of digital signals, each of said indicia codes representing both a frequency and a duration of a corresponding one of said audio tones; and means for printing visible images representing said indicia.

11. The system of claim 10 wherein said means for producing a series of indicia codes comprises:

means for determining the frequency of each of said audio tones from the value of a said count corresponding to said tone;

means for determining the duration of each of said audio tones from the number of successively received counts determined to be of the same frequency; and means for generating a series of indicia codes from said determined frequencies and durations, each of said indicia codes correspponding to one of said audio tones.

12. The system of claim 11 wherein said printing means comprises an ink jet printer adapted to produce on a record medium visible images of indicia representing said indicia codes.

13. The system of claim 12 wherein said comparator means comprises a zero-crossing detector.

14. The system according to claim 13 wherein said pulse-doubling means comprises two dual monostable multivibrators connected in parallel between said comparator means and said pulse-combining means.

15. The system according to claim 14 wherein said pulse-combining means comprises a NOR gate.

16. The system according to claim 15 wherein said audio tones comprise musical notes and wherein said indicia corresponding to said indicia codes comprise visual representations of said musical notes.

17. The system according to claim 10 wherein said means for producing a series of indicia codes comprises a programmed digital computer.

18. An automatic music-transcribing system for translating successive, individual musical tones having characteristic frequencies and durations into visual images of musical notes corresponding to said musical tones, said system comprising:

transducer means for converting said musical tones into electrical signals having characteristic frequencies and durations corresponding to the characteristic frequencies and durations of said musical tones;

frequency digitizer means for producing a train of digital pulses corresponding to said electrical signals;

means for counting the number of pulses occurring in said train of digital pulses during successive predetermined time intervals to produce a series of counts corresponding to the number of pulses occurring during each of said time intervals and for storing said counts, each of said counts reflecting the frequency of one of said musical tones during one of said predetermined time intervals;

means for producing a series of indicia codes from the counts produced by said counting and storing means, said series of indicia codes corresponding to said train of digital pulses, each of said indicia codes also representing both the frequency and the duration of a corresponding one of said musical tones; and means for producing said visible images of said musical notes from said indicia codes corresponding to said musical tones.

19. The music-transcribing system of claim 18 wherein said transducer means comprises a microphone and wherein said electrical signals comprise continuous transitions between positive values and negative values through a zero value.

20. An automatic music-transcribing system for translating successive, individual musical tones having characteristic frequencies and durations into visual images of musical notes corresponding to said musical tones, said system comprising:

transducer means for converting said musical tones into electrical signals having characteristic frequencies and durations corresponding to the characteristic frequencies and durations of said musical tones, said transducer means comprising a microphone and said electrical signals including continuous transitions between positive values and negative values through a zero value;

frequency digitizer means for producing a train of digital pulses corresponding to said electrical signals, said frequency digitizer means comprising:

a comparator means for producing digital signals corresponding to said electrical signals, each of said digital signals having a leading edge corresponding to the transition of said electrical signals from a said positive value to a said zero value and a trailing edge corresponding to the transition of a said electrical signal from a said negative value to a said zero value;

signal-doubling means for producing a digital pulse for each leading edge of said digital signals and each trailing edge of said digital signals; and pulse-combining means for producing said train of digital pulses from said pulses produced by said signal doubling means;

means for counting the number of pulses occurring in said train of digital pulses produced by said pulse-combining means during successive predetermined time intervals to produce a series of counts corresponding to the number of pulses occurring during each of said time intervals and for storing said counts, each of said counts reflecting the frequency of one of said musical tones during one of said predetermined time intervals;

means for producing a series of indicia codes from the counts produced by said counting and storing means, said series of indicia codes corresponding to said train of digital pulses, each of said indicia codes also representing both the frequency and the duration of a corresponding one of said musical tones; and means for producing said visible images of said musical notes from said indicia codes corresponding to said musical tones.

21. The automatic music-transcribing system of claim 20 wherein said producing means comprises:

means for determining the frequency of a said musical tone from said counts;

means for determining the duration of each of said musical tones from the number of successive counts in said series with the same determined frequency; and means for generating a said indicia code uniquely reflecting both a determined frequency and a determined duration.

22. The automatic music-transcribing system of claim 21 wherein said counting and storing means comprises:

a pulse counter for counting the pulses in said train of digital pulses produced by said pulse-combining means;

a count buffer for storing the counts produced by said pulse counter; and timer means for producing count transfer signals for initiating the transfer of a count from said pulse counter to said count buffer at said predetermined time intervals, for producing buffer transfer signals for initiating the transfers of the counts stored in said count buffer to said frequency determining means, for resetting said pulse counter after the transfer of a said count to said count buffer, and for resetting said count buffer after the transfer of a said count from said count buffer to said frequency determining means.

23. The automatic music-transcribing system of claim 22 wherein said comparator means comprises a zero-causing detector.

24. The automatic music-transcribing system of claim 23 wherein said signal-doubling means comprises two dual monostable multivibrators connected in parallel between said zero-crossing detector and said pulse combining means.

25. The automatic music-transcribing system of claim 24 wherein said pulse-combining means comprises a NOR gate.

26. The automatic music-transcribing system of claim 25 wherein said musical tones are included within the frequency range from E below middle C and within three octaves above middle C.

27. The automatic music-transcribing system of claim 22 wherein said producing means comprises a programmed digital computer.

* * * * *